(12) United States Patent
Kondo et al.

(10) Patent No.: US 8,743,290 B2
(45) Date of Patent: Jun. 3, 2014

(54) APPARATUS AND METHOD OF PROCESSING IMAGE AS WELL AS APPARATUS AND METHOD OF GENERATING REPRODUCTION INFORMATION WITH DISPLAY POSITION CONTROL USING EYE DIRECTION

(75) Inventors: Tetsujiro Kondo, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1439 days.

(21) Appl. No.: 12/061,202

(22) Filed: Apr. 2, 2008

(65) Prior Publication Data

US 2008/0259218 A1    Oct. 23, 2008

(30) Foreign Application Priority Data

Apr. 20, 2007  (JP) .................. 2007-112087

(51) Int. Cl.
*H04N 9/31*    (2006.01)

(52) U.S. Cl.
USPC .......................................... 348/700; 348/744

(58) Field of Classification Search
USPC ........................................................ 348/700
IPC .................................................. H04N 5/14,9/31
See application file for complete search history.

(56) References Cited

U.S. PATENT DOCUMENTS

| 5,748,382 | A | 5/1998 | Maguire, Jr. | |
| 6,593,956 | B1 | 7/2003 | Potts et al. | |
| 7,950,802 | B2 * | 5/2011 | Schwerdtner et al. | ........ 351/210 |
| 2002/0140804 | A1 | 10/2002 | Colmenarez et al. | |
| 2005/0041156 | A1 | 2/2005 | Kondo et al. | |
| 2006/0188144 | A1 * | 8/2006 | Sasaki et al. | ................... 382/154 |
| 2008/0056542 | A1 * | 3/2008 | Hung et al. | .................... 382/118 |
| 2008/0231805 | A1 * | 9/2008 | Schwerdtner | .................. 351/210 |

FOREIGN PATENT DOCUMENTS

| EP | 1 039 752 A1 | 9/2000 | |
| EP | 1 499 119 A1 | 1/2005 | |
| JP | 2004-15549 | 1/2004 | |
| JP | 2007-102517 | 4/2007 | |
| WO | WO 2007/019842 | * 2/2007 | ............. H04N 13/00 |

OTHER PUBLICATIONS

Smith, Michael A., et al. "Video Structure and Terminology", Kluwer Academic Publishers, Chapter 2, XP002491313, ISBN: 1-4020-7426-3, 2005, 43 Pages.

(Continued)

*Primary Examiner* — Jay Patel
*Assistant Examiner* — Yulin Sun
(74) *Attorney, Agent, or Firm* — Oblon, Spivak, McClelland, Maier & Neustadt, L.L.P.

(57) ABSTRACT

An apparatus of processing an image contains a scene-change-detecting unit that detects a scene change of input image based on an image signal relative to the input image, a display-position-controlling unit that determines a display position of an image after the scene change to a display position associated with an image before the scene change based on a detection result in the scene-change-detecting unit, and a display-position-setting unit that sets the display position determined in the display-position-controlling unit as a display position in which the image after the scene change is displayed. The display-position-controlling unit detects a feature value of the images before and after the scene change and determines the display position of the image after the scene change based on the feature value of the images.

14 Claims, 25 Drawing Sheets

(56) References Cited

OTHER PUBLICATIONS

Smith, Michael A., et al. "Multimodal Video Characterization", Kluwer Academic Publishers, Chapter 3, XP002491314, ISBN: 1-4020-7426-3, 2005, 50 pages.

Babaguchi, Noboru, et al. "Event Based Indexing of Broadcasted Sports Video by Intermodal Collaboration", IEEE Transactions on Multimedia, vol. 4, No. 1, XP011036264, ISSN: 1520-9210, Mar. 1, 2002, 8 pages.

* cited by examiner

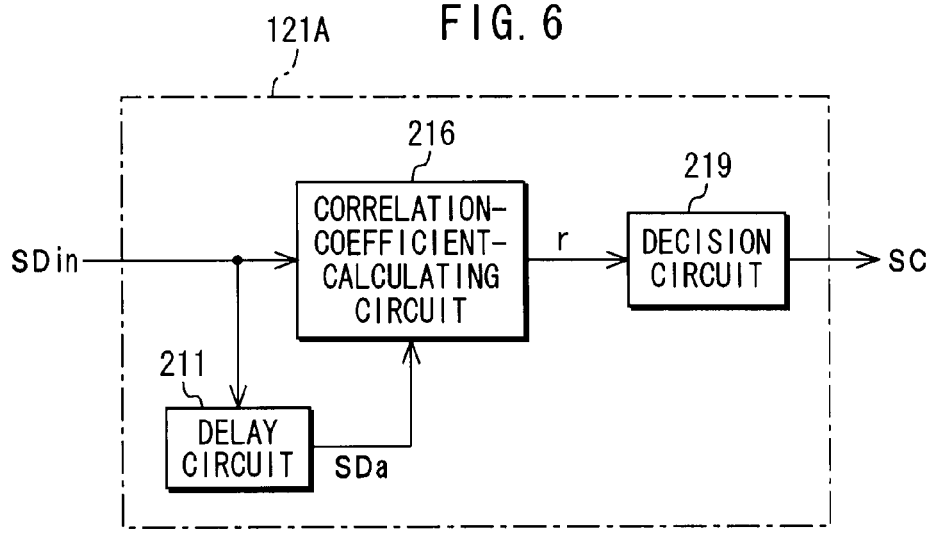
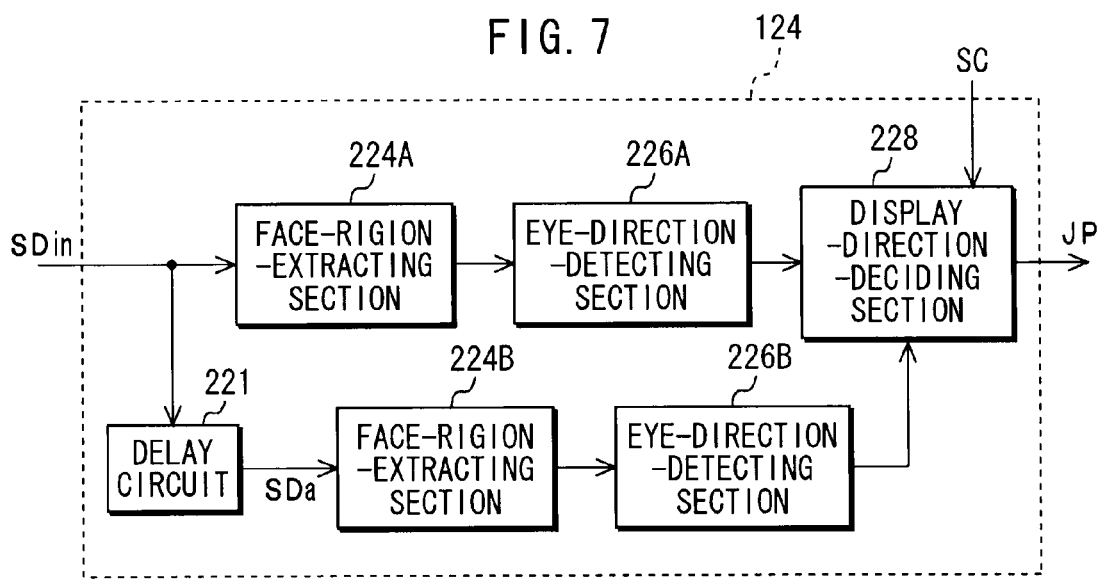

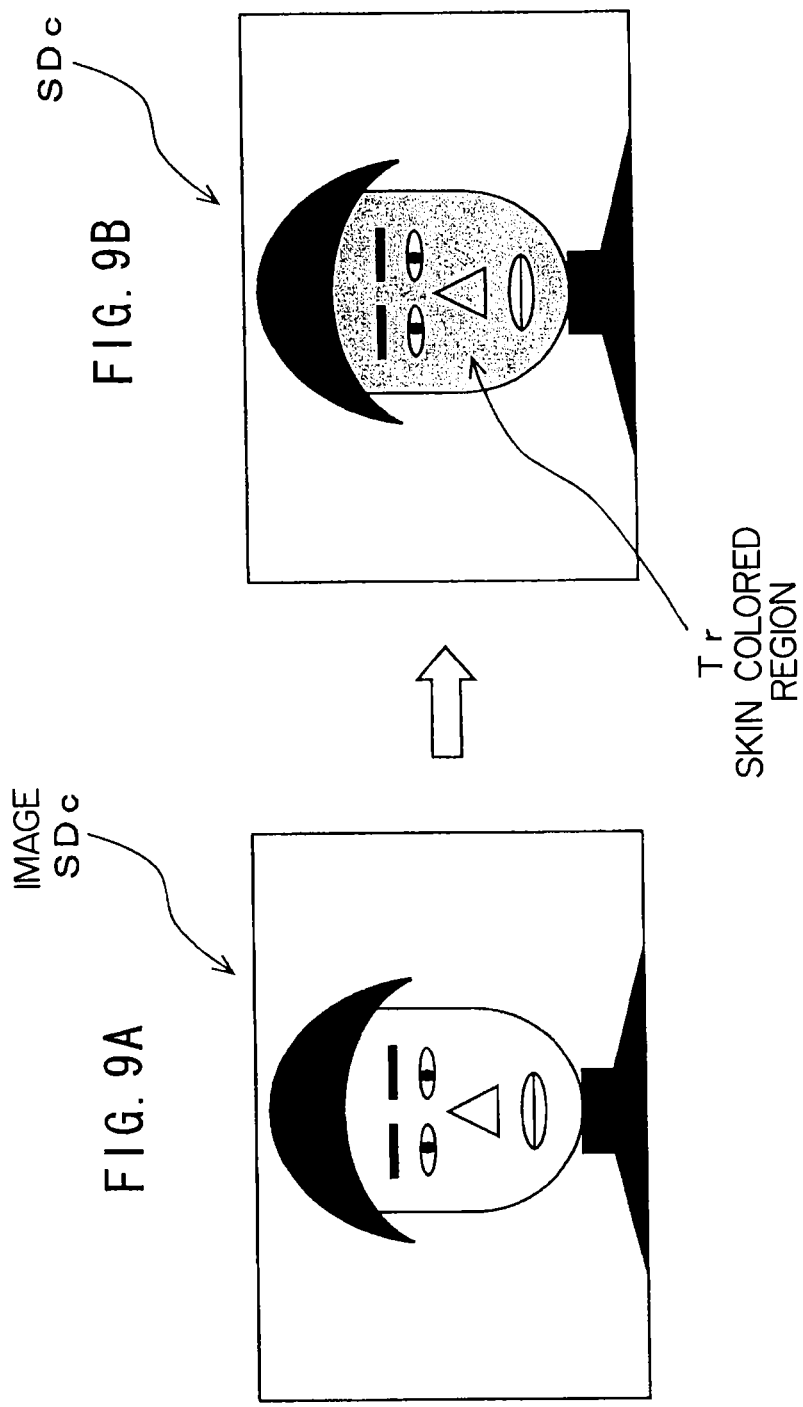

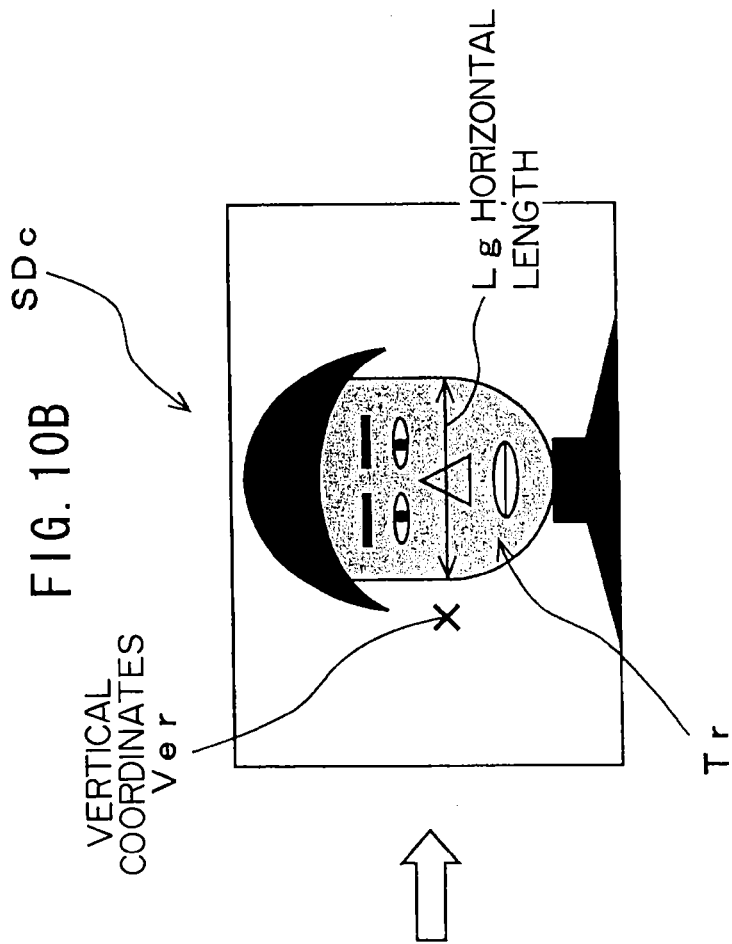
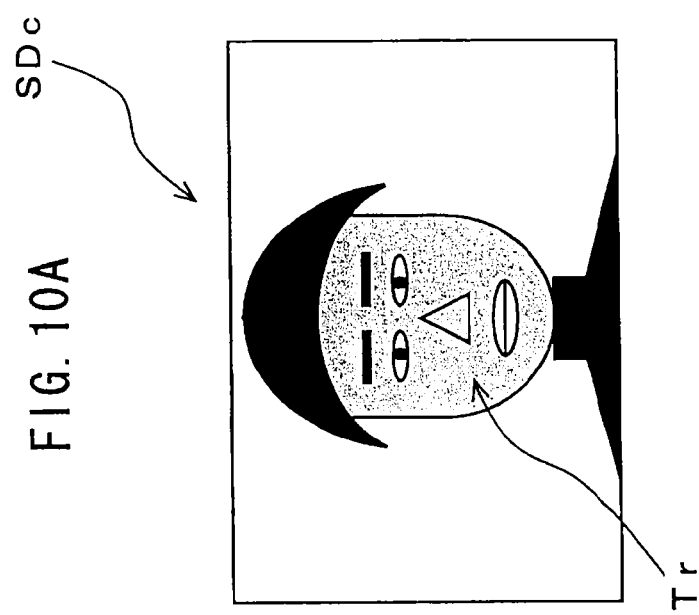

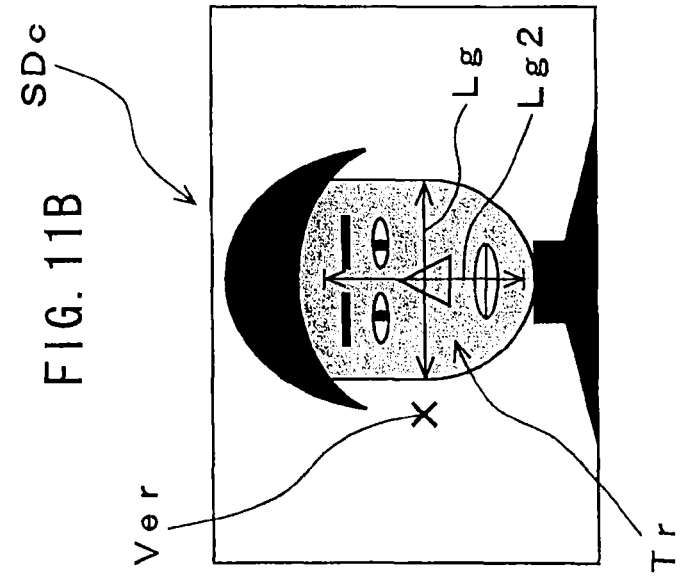
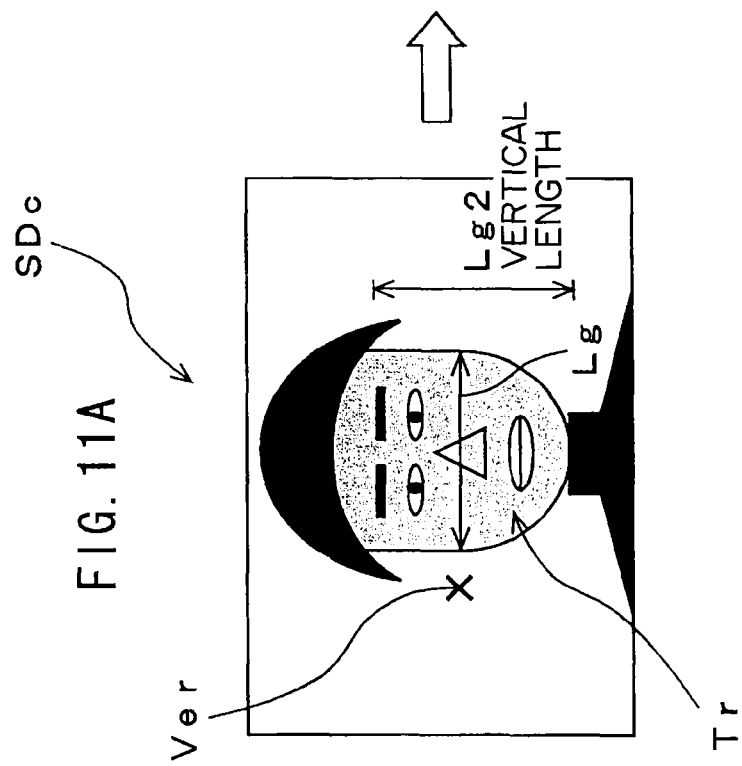

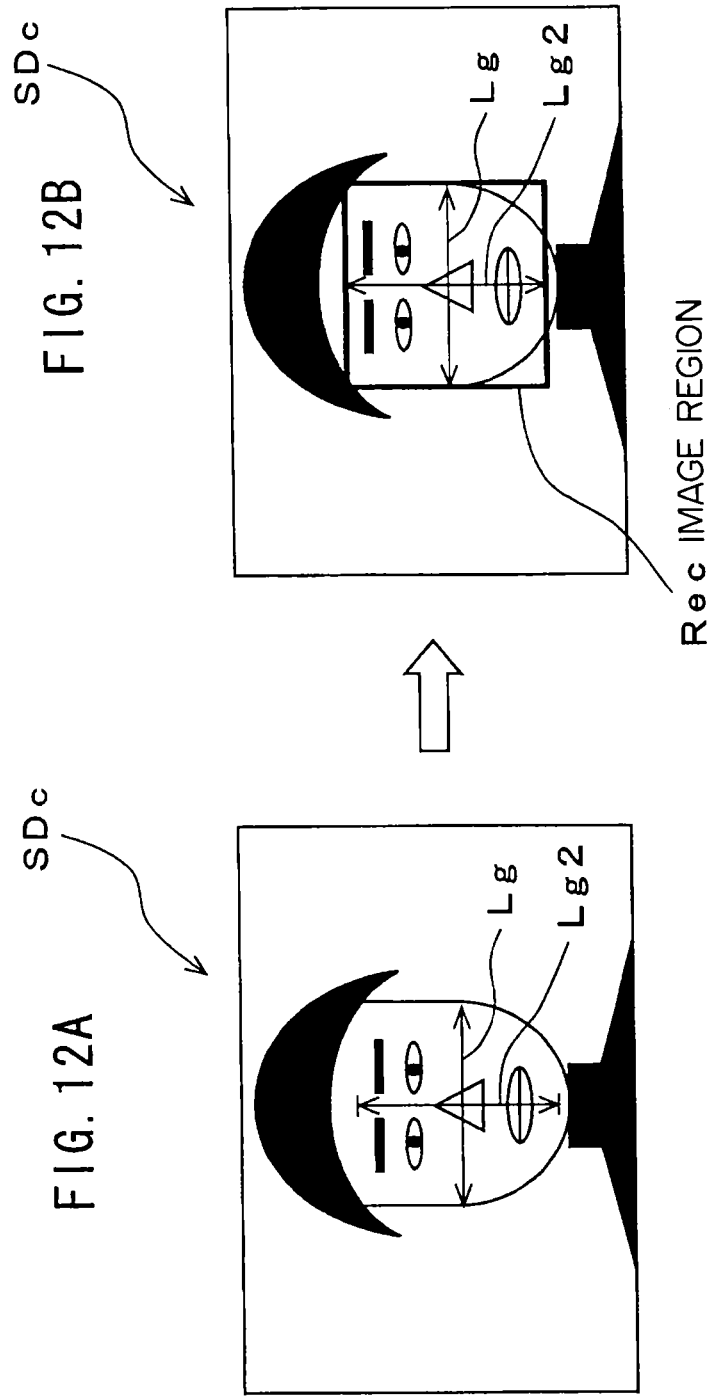

Tnpc
STANDARD FACE IMAGE
TEMPLATE

Rec

LEFT

Tnpa

LEFT DIAGONAL

Tnpb

FRONT

Tnpc

RIGHT DIAGONAL

Tnpd

RIGHT

Tnpe

Tnpc

Receye
PUPIL-OF-EYE
REGIONS

Rec2
IMAGE
REGION

Vtr MOTION VECTOR
Vtr MOTION VECTOR

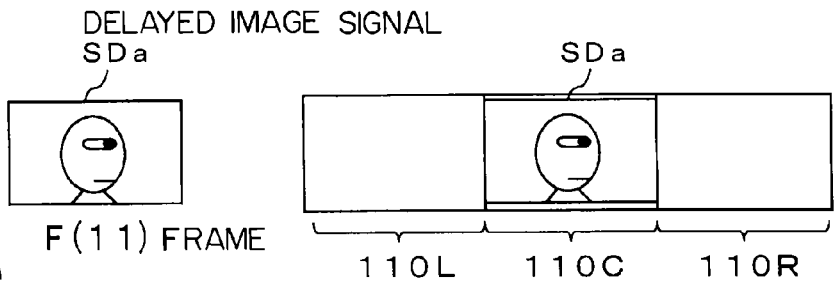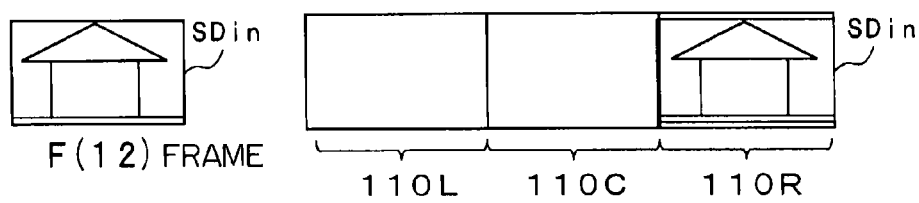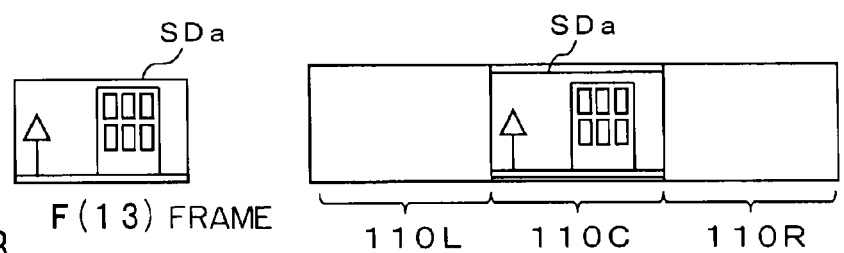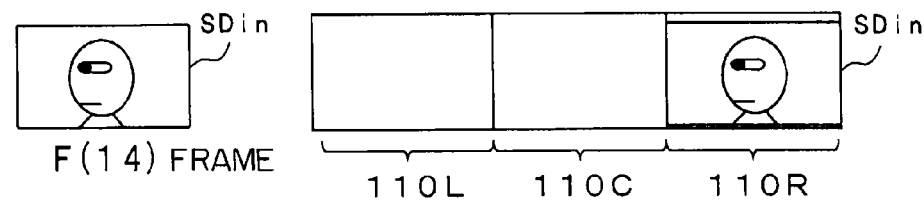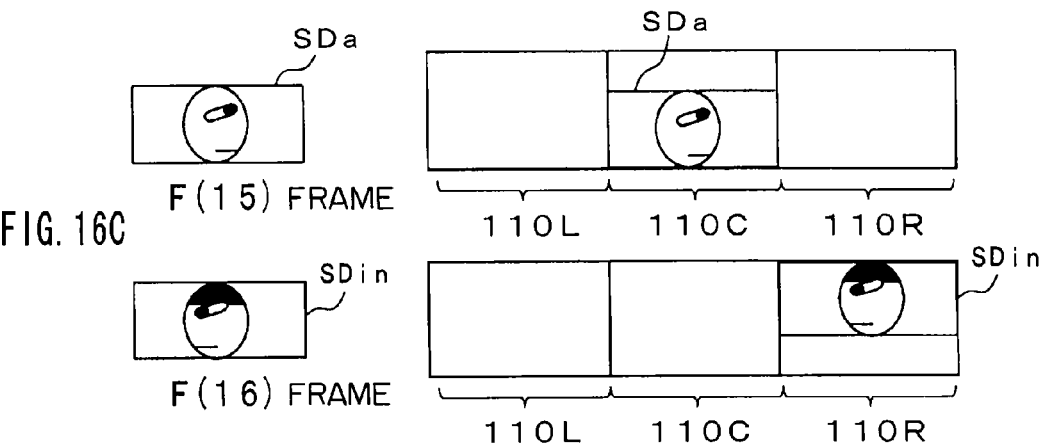

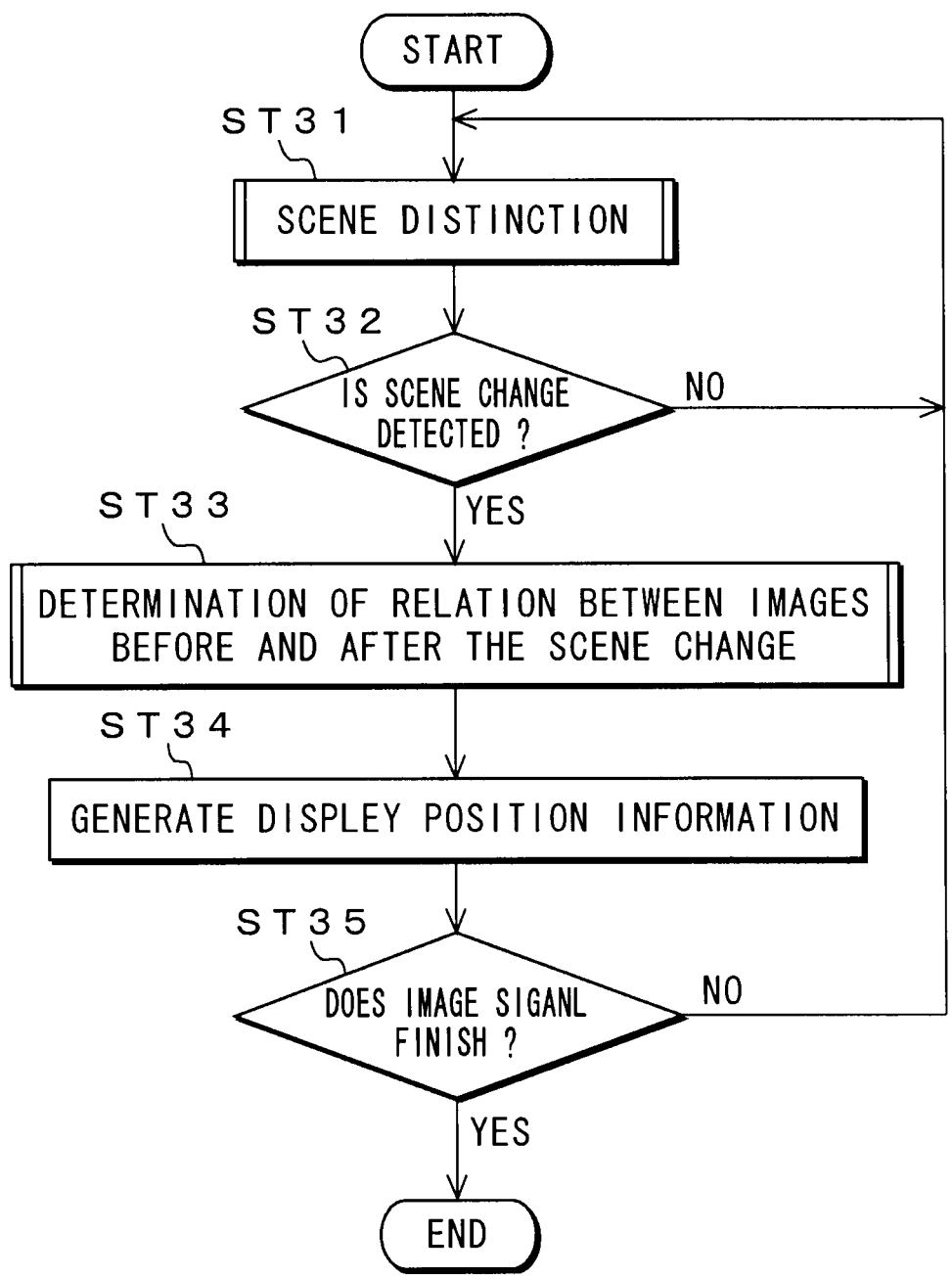

APPARATUS AND METHOD OF PROCESSING IMAGE AS WELL AS APPARATUS AND METHOD OF GENERATING REPRODUCTION INFORMATION WITH DISPLAY POSITION CONTROL USING EYE DIRECTION

CROSS-REFERENCES TO RELATED APPLICATIONS

The present invention contains subject matter related to Japanese Patent Application JP 2007-112087 filed in the Japanese Patent Office on Apr. 20, 2007, the entire contents of which being incorporated herein by reference.

BACKGROUND OF THE INVENTION

1. Field of the Invention

The present invention relates to an apparatus and a method of processing an image and a program product of processing an image as well as an apparatus and a method of generating reproduction information and a program product of generating reproduction information, which are applicable to an apparatus and the like that process the image signal relative to an input image such as a television broadcast program and movie.

2. Description of Related Art

The image display system for displaying the television broadcast program, the movie or the like has used a fixed image frame, in which an image is presented with its display size being conformed to the image frame. When image contents in the television broadcast program, the movie or the like are produced, a creator creates the contents on condition that the image can be displayed in such the fixed image frame.

In order to display an image enhancing its reality, a multiple-display system, a curved display, a wide-view display, a head mount display and the like have been recently developed. The multiple-display system and the like have expanded the image frame to display the wide-viewed image, thereby enabling its reality to be enhanced.

Japanese Patent Application Publication No. 2004-15549 has disclosed an apparatus of processing an image, which processes an image signal relative to an input image such as a television broadcast program and movie. This apparatus of processing an image has set an image display position based on an image signal of an earlier frame to a display position of input image when a difference value between output signal of the earlier frame and the image signal relative to the input image does not exceed a set value in a case of scene change, to enable a viewer to grasp a relation of the scenes easily.

SUMMARY OF THE INVENTION

In association with the above-mentioned image display system, however, when displaying the images successively on the fixed image frame, it may be difficult to understand the contents such as a television broadcast program and movie easily unless a viewer grasps the scene change correctly on the displayed images. Further, it may be difficult to grasp a relation of the scenes if the scene changes occur some times. Additionally, it may be difficult to understand the contents of next scene if the viewer does not see any images of the earlier scene.

Further, by the apparatus of processing the image disclosed in Japanese Patent Application Publication No. 2004-15549, the viewer can grasp the relation of the scenes by estimating similarity in the images before and after the scene change but it is difficult for the viewer to grasp the relation of the scenes based on the contents of the images.

It is desirable to provide an apparatus and a method of processing an image and the like by which the viewer can grasp the relation of the scenes easily based on the contents of the images.

According to an embodiment of the present invention, there is provided an apparatus of processing an image containing a scene-change-detecting unit that detects a scene change of input image based on an image signal relative to the input image, a display-position-controlling unit that determines a display position of an image after the scene change to a display position associated with an image before the scene change based on a detection result in the scene-change-detecting unit, and a display-position-setting unit that sets the display position determined in the display-position-controlling unit as a display position in which the image after the scene change is displayed. The display-position-controlling unit detects a feature value of the images before and after the scene change and determines the display position of the image after the scene change based on the feature value of the images.

By the apparatus of processing the image according to an embodiment of the present invention, the scene-change-detecting unit detects the scene change of the input image based on the image signal relative to the input image. The display-position-controlling unit determines the display position of the image after the scene change to the display position associated with the image before the scene change based on the detection result in the scene-change-detecting unit. In this embodiment, the display-position-controlling unit detects the feature value of the images before and after the scene change and determines the display position of the image after the scene change based on the feature value of the images. For example, the m display-position-controlling unit extracts a region of face image from the image signal, detects eye direction from the region of face image, and decides a display direction of the input image relative to the image signal based on the eye direction thus detected. The display-position-setting unit sets the display position determined in the display-position-controlling unit as the display position in which the image after the scene change is displayed. This enables a viewer to easily grasp a relation between the display positions of the images after and before the scene change based on the eye direction of the subject in the image.

According to another embodiment of the present invention, there is provided a method of processing an image. The method contains a first step of detecting a scene change of input image based on an image signal for the input image, a second step of determining a display position of an image after the scene change to a display position associated with an image before the scene change based on a detection result in the first step, and a third step of setting the display position determined in the second step as a display position in which the image after the scene change is displayed. In the second step, a feature value of the images before and after the scene change is detected and the display position in which the image after the scene change is displayed is determined based on the feature value of the images.

By the method of processing the image according to the embodiment of the present invention, it is possible for a viewer to grasp a scene change easily and to grasp a relation of the contents of the images after and before the scene change easily based on the contents of the images.

According to further embodiment of the present invention, there is provided a program product that allows a computer to process an image signal by implementing the above method of processing the image.

When the computer implements the program product according to the embodiment of the present invention, it is possible for a viewer to grasp a scene change easily and to grasp a relation of the contents of the images after and before the scene change easily based on the contents of the images.

By the embodiments of the apparatus and the method of processing the image and the program product that allows a computer to process an image signal according to the invention, it is possible to display the images which the viewer can understand easily.

According to an embodiment of the present invention, there is provided an apparatus of generating reproduction information that processes an image signal relative to an input image to generate the reproduction information on the input image. The apparatus of generating reproduction information contains a scene-change-detecting unit that detects a scene change of the input image based on the image signal relative to the input image, and a display-position-controlling unit that determines a display position of an image after the scene change to a display position associated with an image before the scene change based on a detection result in the scene-change-detecting unit. The display-position-controlling unit detects a feature value of the images before and after the scene change and generates the reproduction information to determine a display position of the image after the scene change based on the feature value of the images.

By the apparatus of generating the reproduction information according to this embodiment of the present invention, when processing an image signal relative to an input image to generate the reproduction information on the input image, the scene-change-detecting unit detects a scene change of the input image based on the image signal relative to the input image. The display-position-controlling unit determines the display position of the image after the scene change to the display position associates with the image before the scene change based on the detection result in the scene-change-detecting unit. In this embodiment, the display-position-controlling unit detects the feature value of the images before and after the scene change and generates the reproduction information to determine the display position of the image after the scene change based on the feature value of the images. Thus, by reproducing the image based on the reproduction information thus generated, it is possible for a viewer to grasp the scene change and to grasp a relation of the contents of the images after and before the scene change easily based on the contents of the images.

According to still another embodiment of the present invention, there is provided a method of generating reproduction information on an input image by processing an image signal relative to the input image. The method contains a first step of detecting a scene change of the input image based on the image signal relative to the input image, and a second step of determine a display position of an image after the scene change to a display position associating with an image before the scene change based on a detection result in the first step. The second step includes sub-steps of detecting a feature value of the images before and after the scene change and of generating the reproduction information to determine a display position of the image after the scene change based on the feature value of the images.

By the method of generating reproduction information according to the embodiment of the present invention, when reproducing the image based on the reproduction information thus generated, it is possible for a viewer to grasp the scene change and to grasp a relation of the contents of the images after and before the scene change easily based on the contents of the images.

According to still further embodiment of the present invention, there is provided a program product that allows a computer to generate reproduction information for reproducing an image signal relative to an input image by implementing the above method of generating the reproduction information.

By the program product according to the embodiment of the present invention, when reproducing the image based on the reproduction information thus generated, it is possible for a viewer to grasp the scene change and to grasp a relation of the contents of the images after and before the scene change easily based on the contents of the images.

By the embodiments of the apparatus and the method of generating the reproduction information and the program product that allows a computer to generate the reproduction information according to the invention, it is possible to display the images which the viewer can understand easily.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 6 is a block diagram for showing another configuration of the scene-change-detecting unit;

FIG. 7 is a block diagram for showing a configuration of a unit for determining a relation between the images before and after the scene change (before-and-after-scene-change-relation-determining unit);

FIGS. 9A and 9B are illustrations each for explaining an operation example of a skin-colored-region-extracting portion;

FIGS. 10A and 10B are illustrations each for explaining an operation example of a horizontal-line-detecting portion;

FIGS. 11A and 11B are illustrations each for explaining an operation example of a vertical-line-detecting portion;

FIGS. 12A and 12B are illustrations each for explaining an operation example of a face-region-extracting portion;

FIG. 16A is a diagram for showing contents in frames before and after a scene change and images when the frames before and after the scene change are displayed on screens, FIG. 16B is a diagram for showing contents in frames before and after the scene change and images when the frames before and after the scene change are displayed on the screens, and FIG. 16C is a diagram for showing contents in frames before and after the scene change and images when the frames before and after the scene change are displayed on the screens;

FIG. 30 is a flowchart for showing a generation of display position information in a case of performing processing in a real time mode.

DESCRIPTION OF THE PREFERRED EMBODIMENTS

The following will describe embodiments of an apparatus and a method of processing an image and a program product of processing an image as well as an apparatus and a method of generating reproduction information and a program product of generating reproduction information according to the invention with reference to the accompanied drawings.

Figure 1:
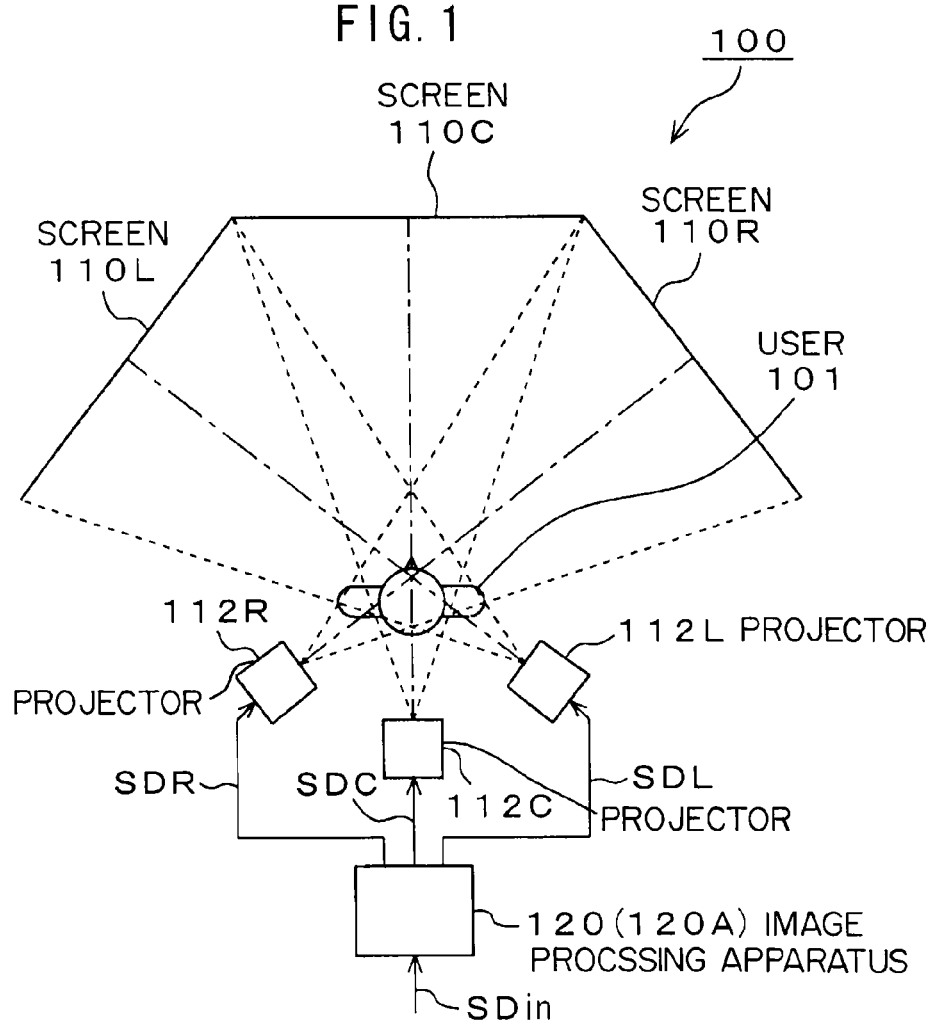
FIG. 1 is a schematic diagram for showing a configuration of an image-display system to which an embodiment of an apparatus of processing an image according to the invention is applicable.

FIG. 1 shows a configuration of an image-display system 100 to which an embodiment of an apparatus 120 of processing an image according to the invention is applicable. The image-display system 100 contains three screens 110L, 110C, and 110R, which are arranged on a front and both sides of a user 101 and constitutes one image display area as a whole. Projectors 112L, 112C, and 112R are provided respectively corresponding to the screens 110L, 110C, and 110R. The projectors 112L, 112c, and 112R are connected to an apparatus 120 of processing an image. The projector 112L projects an image on the screen 110L based on an output signal SDL received from the apparatus 120 of processing the image. Similarly, the projectors 112C and 112R respectively project images on the screens 110C and 110R based on output signals SDC and SDR received from the apparatus 120 of processing the image.

The apparatus 120 of processing the image receives an input image signal SDin relative to input image and detects a scene change to determine whether or not the scene change occurs. If the scene change occurs, the apparatus 120 of processing the image also detects whether or not there is a relation between images before and after the scene change. If there is the relation, the apparatus 120 of processing the image changes image display positions of the images before and after the scene change so that the images before and after the scene change can have the relation.

Figure 2:
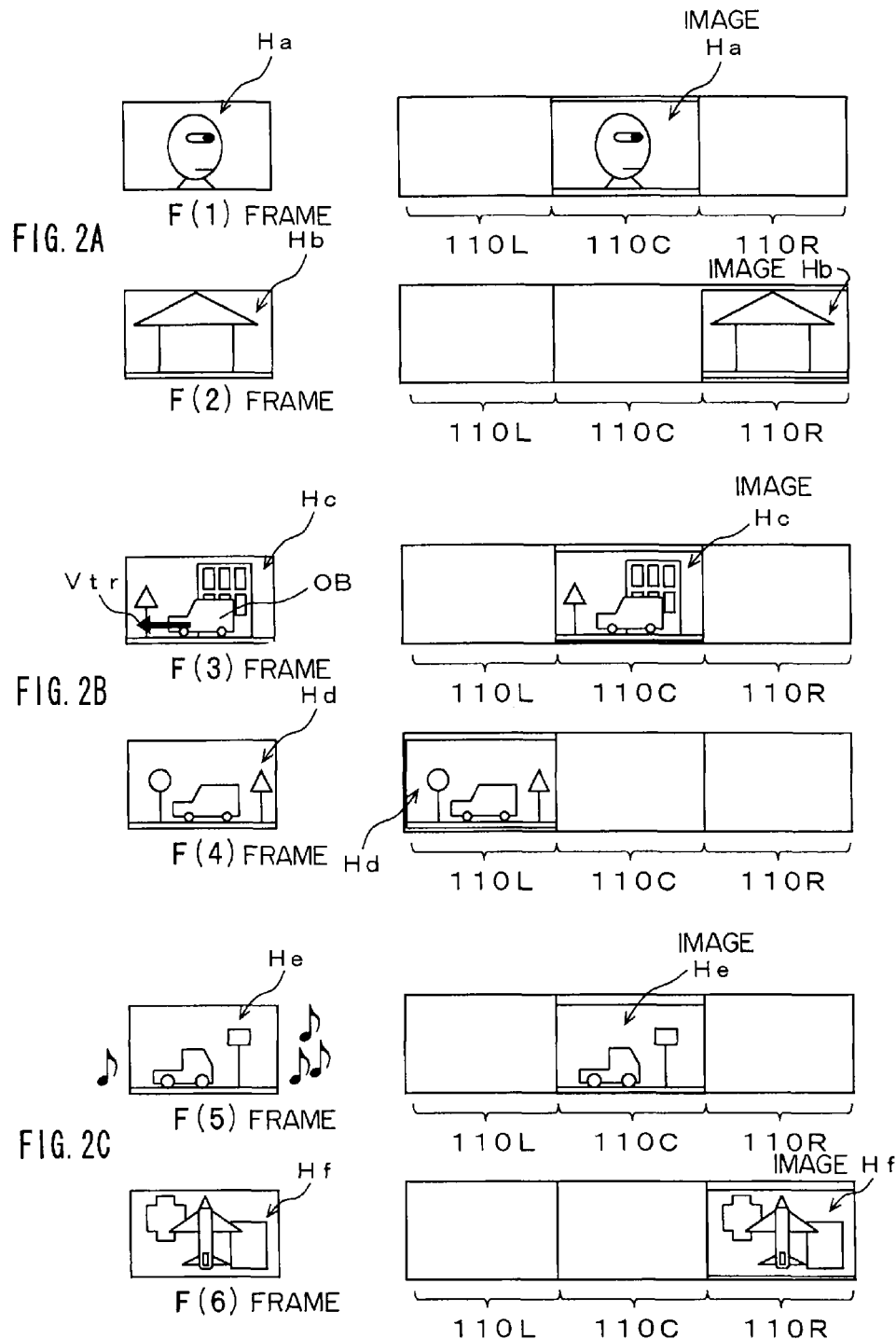
FIG. 2A is a diagram for showing contents in frames before and after a scene change and images when the frames before and after the scene change are displayed on screens.
FIG. 2B is a diagram for showing contents in frames before and after the scene change and images when the frames before and after the scene change are displayed on the screens.
FIG. 2C is a diagram for showing contents in frames before and after the scene change and images when the frames before and after the scene change are displayed on the screens.

FIGS. 2A through 2C, respectively, show examples of an image display in the image-display system 100.

FIG. 2A shows images in frames F(1) and F(2) and images when the frames F(1) and F(2) are respectively displayed on any of the screens 110L, 110C and 110R. FIG. 2B shows images in frame F (3) and F (4) and images when the frames F (3) and F (4) are displayed on any of the screens 110L, 110C and 110R. FIG. 2C shows images in frame F (5) and F (6) and images when the frames F (5) and F (6) are respectively displayed on any of the screens 110L, 110C and 110R.

When a scene change occurs while a subject in an input image turns his or her eyes to a right side of the frame F(1) as shown in FIG. 2A, an image Hb after the scene change relative to the frame F(2) is displayed on the screen 110R if an image Ha before the scene change relative to the frame F(1) is displayed on the screen 110C because the image Hb after the scene change is associated with a direction to which the subject turns his or her eyes.

When a scene change occurs while an object OB in an input image moves to a left side of the frame F (3) as shown in FIG. 2B, an image Hd after the scene change relative to the frame F (4) is displayed on the screen 110L if an image Hc before the scene change relative to the frame F (3) is displayed on the screen 110C because the image Hd after the scene change is associated with a direction to which the object OB moves.

When a scene change occurs while right side volume is larger than left side volume in an input stereo audio relative to an image He of the frame F(5) as shown in FIG. 2C (in this case, numbers of eighth notes indicate the volume), an image Hf after the scene change relative to the frame F(6) is displayed on the screen 110R if an image He before the scene change relative to the frame F(S) is displayed on the screen 110C because the image Hf after the scene change is associated with a direction in which any sound having the larger volume is produced.

Figure 3:
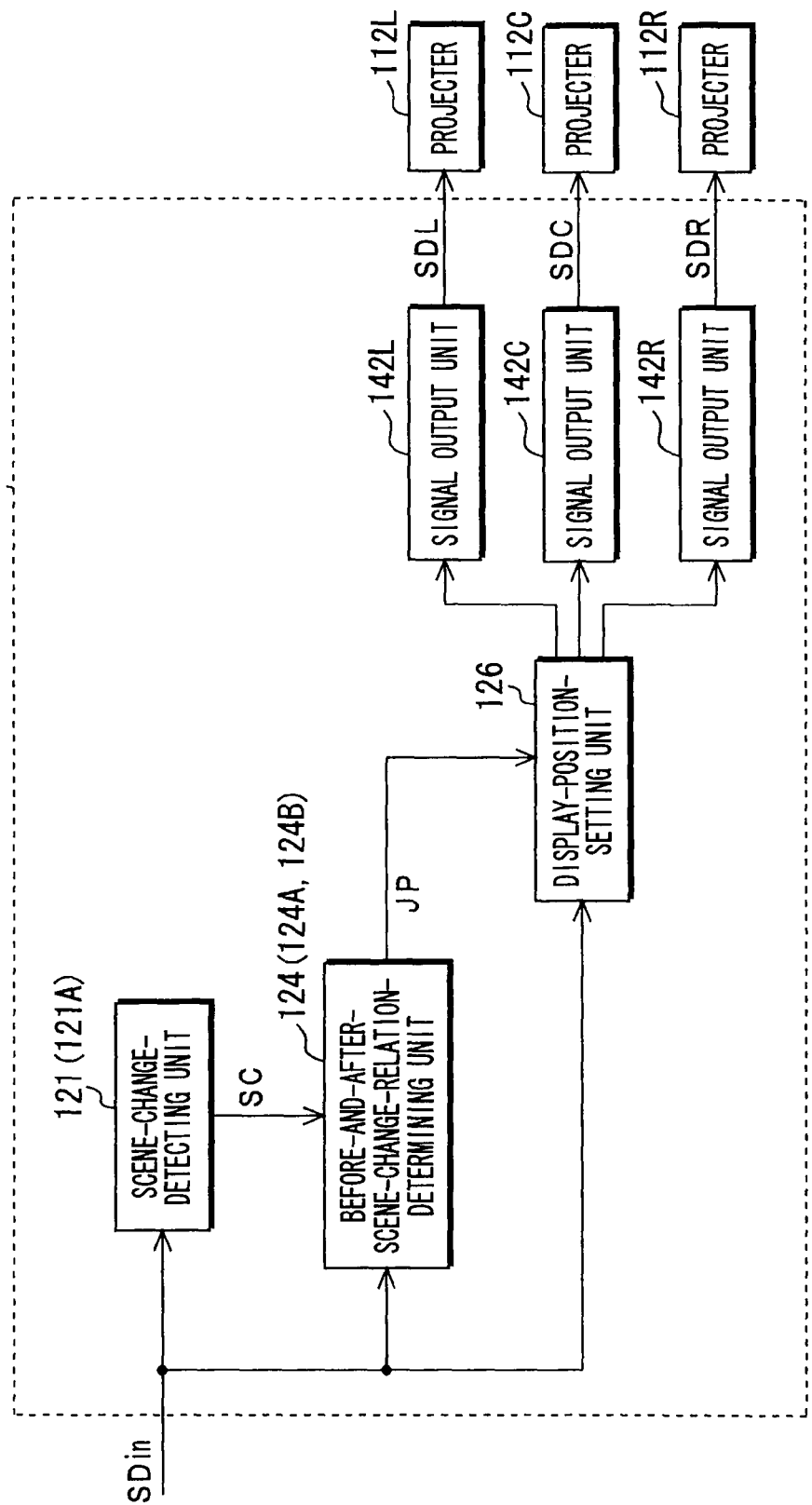
FIG. 3 is a block diagram for showing a configuration of an embodiment of an apparatus of processing an image according to the invention.

When the display position is changed for each scene as described above, the apparatus 120 of processing the image, which is shown in FIG. 1, changes the display position by performing processing in a real time mode or an off-line mode. In a case of performing processing in the real time mode, the apparatus 120 of processing the image, which is shown in FIG. 3, receives an image signal SDin relative to the input image, detects the scene change based on the image signal SDin, and determines a relation between the images before and after the scene change. The apparatus 120 of processing the image also changes the display position (a direction to be displayed) of the input image based on a detection result of the scene change and a determination result of the relation between the images before and after the scene change in a real time. The apparatus 120 of processing the image then generates and outputs the output signals SDL, SDC, and SDR to display the input images on their changed display positions.

Figure 19:
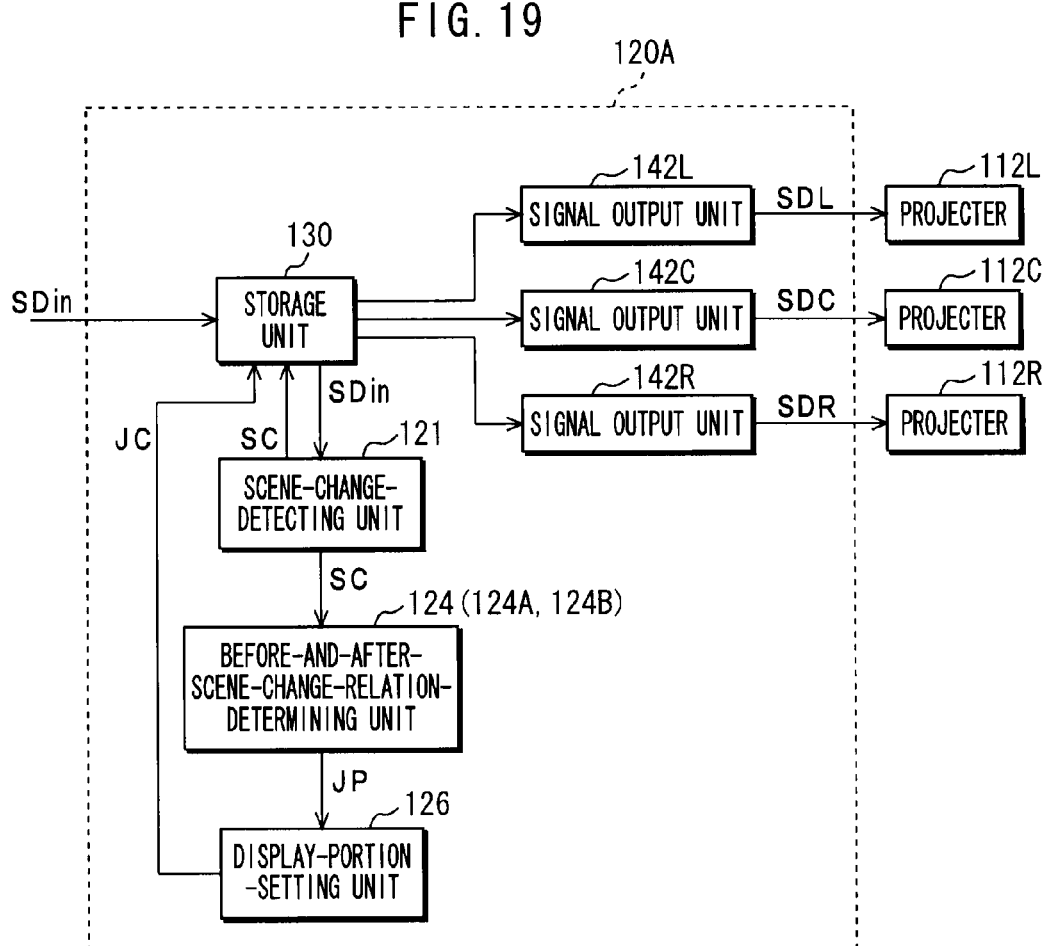
FIG. 19 is a block diagram for showing a configuration of another embodiment of the apparatus of processing an image according to the invention in a case of performing processing in an off-line mode.

In a case of performing processing in an off-line mode, the apparatus 120A of processing the image, which is shown in FIG. 19, reads the accumulated image signal SDin out of the storage medium or the like and detects a scene change therefrom. The apparatus 120A of processing the image determines a relation between the images before and after each of the scene changes thus detected to decide a display position of a current scene from past and future scenes. The apparatus 120A of processing the image keeps display position information JP indicating the decided display position (the direction to be displayed) with associating the image signal SDin.

In order to display the image, the apparatus 120A of processing the image then reads out the image signal SDin of the input image and the display position information JP, and generates and outputs the output signals SDL, SDC, and SDR to display the input images on their changed display positions based on the image signal SDin and the display position information JP.

FIG. 3 shows a configuration of an embodiment of the apparatus 120 of processing an image according to the invention in a case of performing processing in the real time mode. A scene-change-detecting unit 121, a unit 124 for determining a relation between the images before and after the scene change (hereinafter, referred to as "before-and-after-scene-change-relation-determining unit"), and a display-position-setting unit 126 respectively receive the image signal SDin relative to the input image.

The scene-change-detecting unit 121 detects a scene change, i.e., a position of discontinuity in images, namely, a joint portion between a consecutive scene and a scene that is different from the consecutive scene, based on the image signal SDin.

Figure 4:
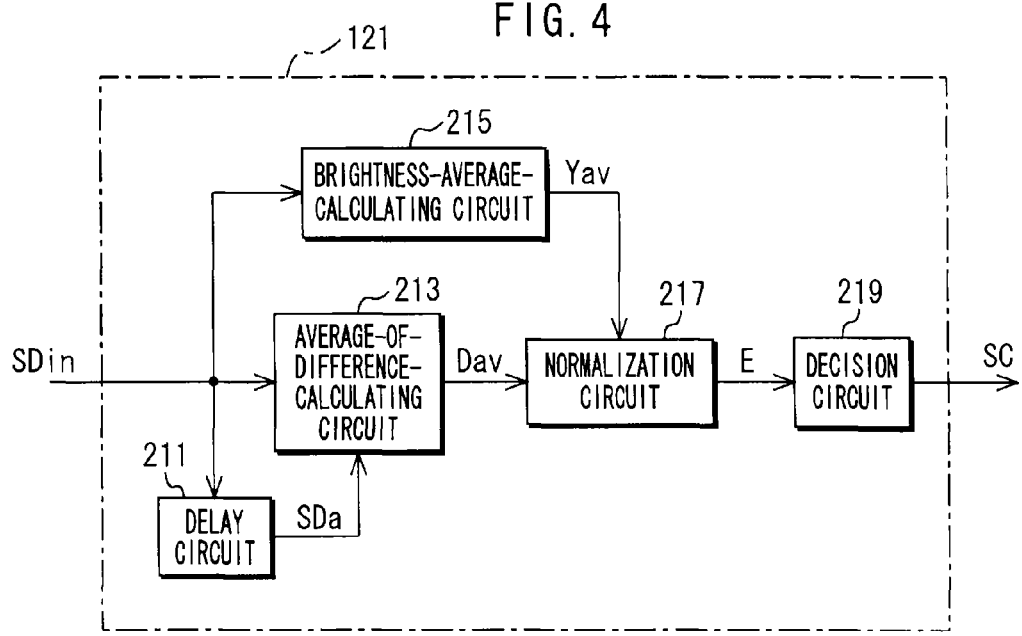
FIG. 4 is a block diagram for showing a configuration of a scene-change-detecting unit.

FIG. 4 shows a configuration of the scene-change-detecting unit 121 that detects a scene change by utilizing an image signal of two frames.

A delay circuit 211 in the scene-change-detecting unit 121 receives the input image signal SDin, delays the input image signal SDin by one frame, and supplies it to an average-of-difference-calculating circuit 213 as a delayed image signal SDa. The average-of-difference-calculating circuit 213 receives the image signal SDin and the delayed image signal SDa, calculates an average value Dav of differences between the two frames based on the image signal SDin and the delayed image signal SDa, and supplies the average value Dav of differences to a normalization circuit 217. The differences in brightness level between the two frames on respective pixels are calculated and an average value of the obtained differences is also calculated as the average value Dav of differences, which is supplied to the normalization circuit 217. The average value Dav of differences can be calculated according to the following expression (1):

$$Dav = \frac{\sum_{i=1}^{N} |YCi - YPi|}{N} \quad (1)$$

where N is number of pixels in an image of one frame, YC is a brightness level of a pixel based on the image signal SDin, and YP is a brightness level of the pixel based on the delayed image signal SDa.

The average value Dav of differences varies greatly according to the brightness level in the image. For example, in a case of displaying the image in light tones, the average value Dav of differences increases only by changing a part of the image to dark one even if no scene changes. In a case of displaying the image in dark tones, the average value Dav of differences does not increase because of small change in the brightness level even if a scene changes. Thus, the scene-change-detecting unit 121 contains the normalization circuit 217 which normalizes the average value Dav of differences according to brightness in the image so that a correct scene change can be detected by receiving any less influence by the brightness in the image.

A brightness-average-calculating circuit 215 in the scene-change-detecting unit 121 calculates an average value of the brightness levels in one frame based on the brightness level of each pixel from the image signal SDin. The brightness-average-calculating circuit 215 then supplies the calculated average value to the normalization circuit 217 as a brightness average value Yav. The brightness average value Yav can be calculated according to the following expression (2):

$$Yav = \frac{\sum_{i=1}^{N} YCi}{N} \quad (2)$$

where N is number of pixels in an image of one frame and YC is a brightness level of a pixel based on the image signal SDin.

The normalization circuit 217 normalizes the average value Dav of differences. Namely, the normalization circuit 217 generates a normalized value E of the average value of differences (hereinafter referred to as "normalized value E") by correcting the average value Dav of differences for the brightness average value Yav indicating the brightness in the image according to the following expression (3):

$$E = \frac{Dav}{Yav} \quad (3)$$

The normalization circuit 217 then supplies the normalized value E to a decision circuit 219 in the scene-change-detecting unit 121. The decision circuit 219 receives the normalized value E and compares the normalized value E with a threshold value, which has previously been determined therein, and decides that a scene changes if the normalized value E exceeds the threshold value. The decision circuit 219, however, decides that any scene does not change if the normalized value E does not exceed the threshold value. The decision circuit 219 then generates a scene change detection signal SC indicating a result of this decision and supplies the scene change detection signal SC to the before-and-after-scene-change-relation-determining unit 124 shown in FIG. 3.

Thus, the normalization circuit 217 has normalized the average value Dav of differences according to brightness in the image and the decision circuit 219 has decided whether the scene changes or not by using the normalized value E, so that the correct scene change can be detected by receiving any less influence by the brightness in the image.

Although, in the above-mentioned scene-change-detecting unit 121, the scene change has been detected using the signal on all pixels within one frame, it may take a lot of time to perform any calculation processing thereon if calculating the average value Dav of differences and the brightness average value Yav using the signal on all pixels. If such the calculation performs at high speed in order to save a period of time for calculation, a cost therefor may increase.

Figure 5:
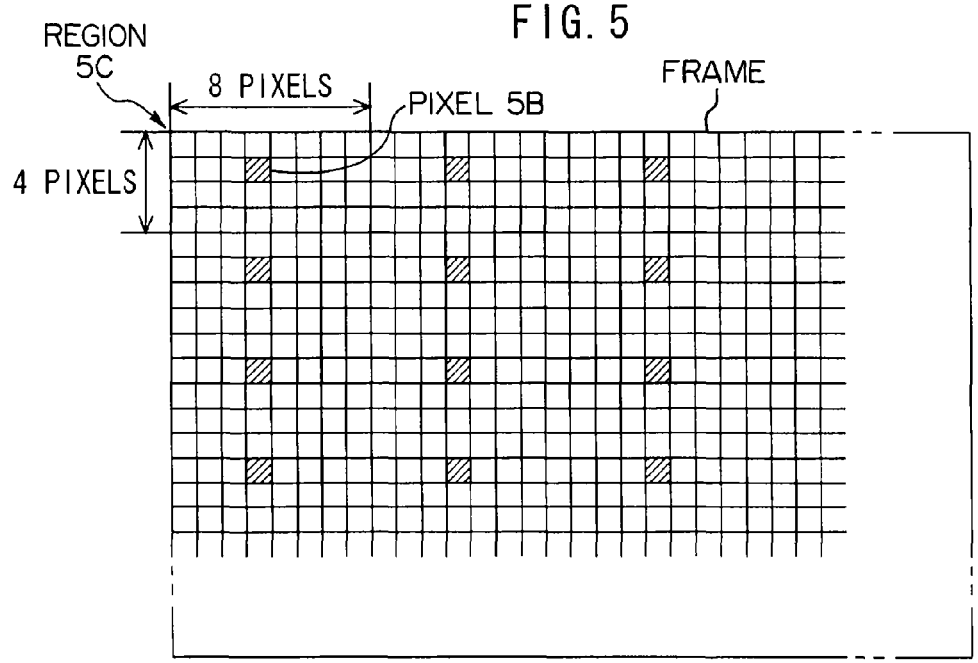
FIG. 5 is a diagram for illustrating a thinning process of pixels.

A thinning process on pixels thus performs. For example, as shown in FIG. 5, an image of one frame 5A is classified into regions 5C each of 8×4 pixels and diagonally shaded one pixel 5B is selected from each region. Using the signal on the selected pixels 5B then enables the average value Day of differences and the brightness average value Yav to be calculated. Such the thinning process enables an amount of calculation to be reduced, thereby making the calculation processing easy and avoiding any rapid calculation processing to prevent the cost for the calculation processing from being increased.

Although, in the above-mentioned scene-change-detecting unit 121, the scene change has been detected using the normalized value E, it is desirable to obtain a correlation coefficient r between images of two frames and compare the correlation coefficient r with a threshold value, thereby enabling a scene change to be accurately detected.

FIG. 6 shows a configuration of a scene-change-detecting unit 121A using the correlation coefficient r.

A delay circuit 211 in the scene-change-detecting unit 121A receives the image signal SDin, delays the image signal SDin by one frame, and supplies it to a correlation-coefficient-calculating circuit 216 as a delayed image signal SDa. The correlation-coefficient-calculating circuit 216 receives the image signal SDin and the delayed image signal SDa and calculates the correlation coefficient r based on the image signal SDin and the delayed image signal SDa.

The correlation coefficient r can be calculated according to the following expression (4):

$$r = \frac{\sum_{i=1}^{N}(YFi-YFav)(YSi-YSav)}{\sqrt{\sum_{i=1}^{N}(YFi-YFav)^2}\sqrt{\sum_{i=1}^{N}(YSi-YSav)^2}} \quad (4)$$

where N is number of pixels in an image of one frame, YF is a brightness level of a pixel based on the image signal of a first frame, YS is a brightness level of a pixel based on the image signal of a next frame, YFav is an average of brightness levels of pixels based on the image signal of the first frame, and YSav is an average of brightness levels of pixels based on the image signal of the next frame.

The correlation-coefficient-calculating circuit 216 supplies the calculated correlation coefficient r to a decision circuit 219 in the scene-change-detecting unit 121A.

The decision circuit 219 receives the correlation coefficient r, compares the correlation coefficient r with a threshold value, which has previously been determined therein, and decides that a scene changes if the correlation coefficient r does not exceed the threshold value. The decision circuit 219, however, decides that any scene does not change, i.e., the scene is a consecutive scene if the correlation coefficient r exceeds the threshold value. The decision circuit 219 then generates a scene change detection signal SC indicating a result of this decision and supplies the scene change detection signal SC to the before-and-after-scene-change-relation-determining unit 124 shown in FIG. 3.

FIG. 7 shows a configuration of the before-and-after-scene-change-relation-determining unit 124. The before-and-after-scene-change-relation-determining unit 124 constitutes the display-position-controlling unit. The before-and-after-scene-change-relation-determining unit 124 receives the scene change detection signal SC from the scene-change-detecting unit 121 and determines a display position of an image after the scene change to a display position associated with an image before the scene change based on the scene change detection signal SC of the scene-change-detecting unit 121. In this embodiment, the before-and-after-scene-change-relation-determining unit 124 detects a feature value between the images before and after the scene change and determines a display position of the image after the scene change based on the feature value.

A delay circuit 221 and a first face-region-extracting section 224A in the before-and-after-scene-change-relation-determining unit 124 respectively receive the image signal SDin relative to the input image as shown in FIG. 7. The delay circuit 221 delays the image signal SDin by one frame to generate a delayed image signal SDa. The delay circuit 221 supplies the delayed image signal SDa to a second face-region-extracting section 224B in the before-and-after-scene-change-relation-determining unit 124. It is supposed that the first face-region-extracting section 224A, which receives the image signal SDin of the input image, has the same configuration as that of the second face-region-extracting section 224B, which receives the delayed image signal SDa. The first face-region-extracting section 224A extracts a face region from the image signal SDin and the second face-region-extracting section 224A extracts a face region from the delayed image signal SDa.

Figure 8:
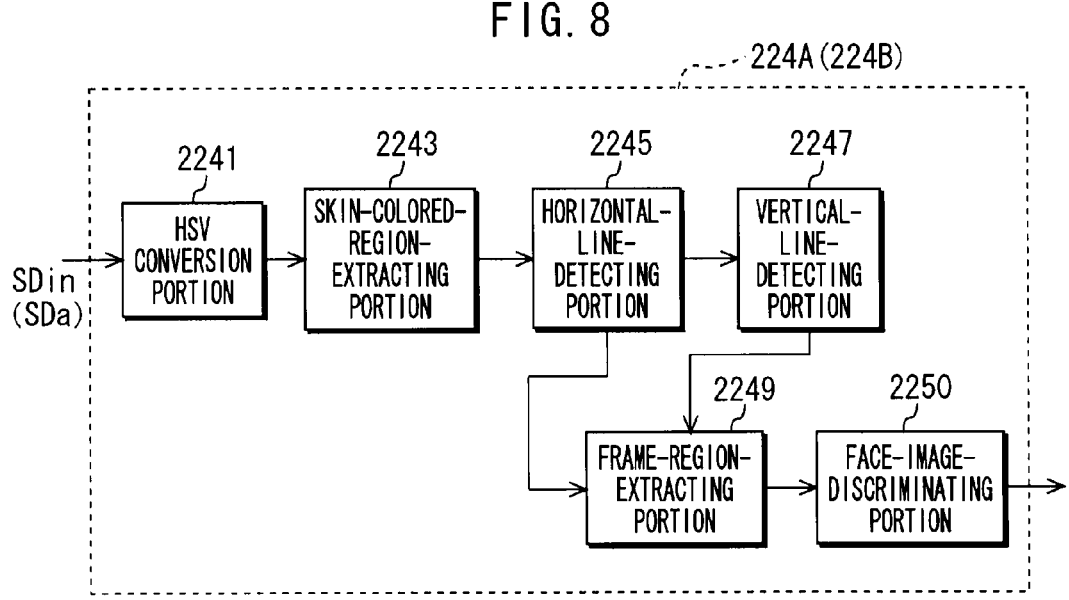
FIG. 8 is a block diagram for showing a configuration of a face-region-extracting section.

FIG. 8 shows a configuration of the face-region-extracting section 224A or 224B. An HSV conversion portion 2241 of the face-region-extracting section 224A shown in FIG. 8 receives the image signal SDin and performs HSV (hue, saturation, and value) conversion on the image signal SDin to use the HSV color space.

FIGS. 9A and 9B illustrate an operation example of a skin-colored-region-extracting portion 2243. The skin-colored-region-extracting portion 2243 extracts pixels having a value of hue within a set range thereof, for example, more than 20 and less than 40 (20<Hu<40), from an image SDc shown in FIG. 9A. The skin-colored-region-extracting portion 2243 performs labeling on the extracted pixels, decides that this labeled region is a skin colored region Tr (shaded region shown in FIG. 9B), and extracts this skin colored region Tr.

FIGS. 10A and 10B illustrate an operation example of a horizontal-line-detecting portion 2245 shown in FIG. 8. The horizontal-line-detecting portion 2245 counts the pixels extracted from the skin colored region Tr shown in FIG. 10A on each horizontal line and detects a horizontal line having a horizontal length Lg with counted maximum numbers of pixels in the skin colored region Tr, as shown in FIG. 10B. Vertical coordinates (vertical reference point) Ver are obtained based on a position of this horizontal line. The counted maximum numbers of pixels are multiplied by a predetermined value, for example, 0.8. This product is set as a horizontal length Lg and a middle of the horizontal length Lg is aligned to a center of the extracted skin colored region Tr in a horizontal direction thereof.

FIGS. 11A and 11B illustrate an operation example of a vertical-line-detecting portion 2247 shown in FIG. 8. The vertical-line-detecting portion 2247 multiplies the detected horizontal length Lg shown in FIG. 11A by a predetermined value, for example, 1.3 and the product is set as a vertical length Lg2. The vertical reference point Ver shown in FIG. 11B is set as a middle of the vertical length Lg2.

FIGS. 12A and 12B illustrate an operation example of a frame-region-extracting portion 2249 shown in FIG. 8. The frame-region-extracting portion 2249 extracts an image region boxed by a box having the horizontal length Lg detected in the horizontal-line-detecting portion 2245 and the vertical length Lg2 detected in the vertical-line-detecting portion 2247 as shown in FIG. 12A. In this embodiment, as shown in FIG. 12B, an image region Rec boxed by a box having the horizontal length Lg and the vertical length Lg2 is set as an frame image region to be extracted.

Figure 13A:
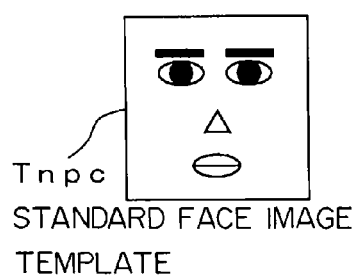
FIGS. 13A and 13B are illustrations each for explaining an operation example of a face-image-discriminating portion.
Figure 13B:
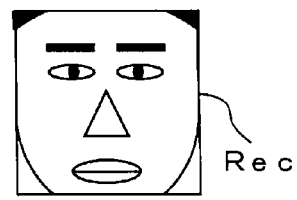

FIGS. 13A and 13B illustrate an operation example of a face-image-discriminating portion 2250 shown in FIG. 8. The face-image-discriminating portion 2250 has a standard face image template Tnpc as shown in FIG. 13A and calculates sum total of absolute values of the differences between this template Tnpc and the image region Rec extracted in the frame-region-extracting portion 2249, for example, on each pixel. The face-image-discriminating portion 2250 compares the calculated sum total of absolute values of the differences with a predetermined threshold value. If the sum total of absolute values of the differences does not exceed the predetermined threshold value, the face-image-discriminating portion 2250 decides that the extracted image region Rec is a face image while if the sum total of absolute values of the differences exceeds the predetermined threshold value, the face-image-discriminating portion 2250 decides that the extracted image region Rec is not a face image.

It is to be noted that when a size of the extracted image region Rec does not match a size of the template Tnpc, the size of the template Tnpc is properly adjusted by any interpolation or thinning to match their sizes and then, the above-mentioned processing is carried out.

Figure 14A:
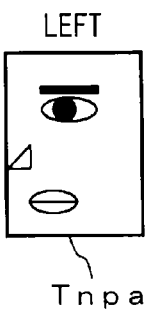
FIGS. 14A through 14E are illustrations each for explaining another operation example of the face-image-discriminating portion.
Figure 14B:
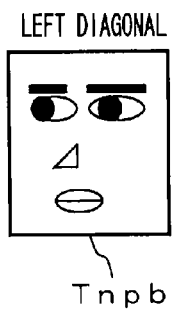
Figure 14C:
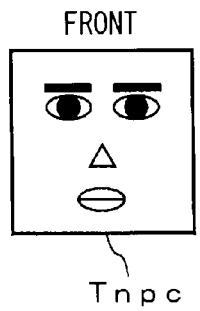
Figure 14D:
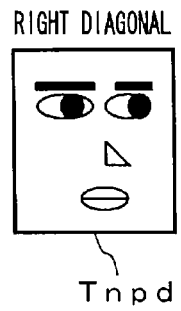
Figure 14E:
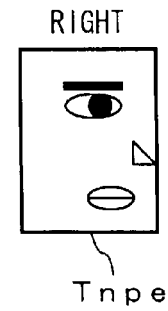

The face-image-discriminating portion 2250 discriminates a direction of face in addition to the discrimination of the face image. FIGS. 14A through 14E illustrate an operation example of the face-image-discriminating portion 2250. The face-image-discriminating portion 2250 has standard face image templates other than the standard face image template Tnpc shown in FIG. 14C in which the face looks forward. As shown in FIGS. 14A through 14E, in this embodiment, the face-image-discriminating portion 2250 has five standard face image templates, namely, the standard face image template Tpna in which the face looks left as shown in FIG. 14A, the standard face image template Tpnb in which the face looks obliquely left as shown in FIG. 14B, the standard face image template Tpnc in which the face looks forward as shown in FIG. 14C, the standard face image template Tpnd in which the face looks obliquely right as shown in FIG. 14D, and the standard face image template Tpne in which the face looks right as shown in FIG. 14E.

When the face-image-discriminating portion 2250 discriminates the face image by means of the matching using the templates, the face-image-discriminating portion 2250 may calculate sum total of absolute values of the differences between each of these templates Tnpa through Tpne in which the face looks in different directions and the image region Rec extracted in the frame-region-extracting portion 2249 on each pixel. The face-image-discriminating portion 2250 compares the calculated sum total of absolute values of the differences with a threshold value. If the calculated sum total of absolute values of the differences does not exceed the threshold value and becomes the minimum value, the face-image-discriminating portion 2250 discriminates it as the direction of face. It is to be noted that if the face does not look forward, the image region Rec extracted in the skin-colored-region-extracting portion 2243 is smaller than the image region Rec extracted in the skin-colored-region-extracting portion 2243 when the face looks forward so that sizes of the templates can be smaller. In the standard face image templates, the face can look upward and downward in addition to right and left.

It is to be noted that the face-image-discriminating portion 2250 discriminates the face image on all of the image regions REC extracted in the frame-region-extracting portion 2249. If the face-image-discriminating portion 2250 discriminates the plural face images, the face-image-discriminating portion 2250 discriminates the face image having, for example, the largest image region Rec from the face images. If no face image is discriminated, the process finishes.

Referring back to FIG. 7, a first eye-direction-detecting section 226A detects a first eye direction from the image region Rec of the face image extracted in the first face-region-extracting section 224A relative to the image signal SDin. A second eye-direction-detecting section 226B detects a second eye direction from the image region Rec of the face image extracted in the second face-region-extracting section 224B relative to the delayed image signal SDa.

Figure 15A:
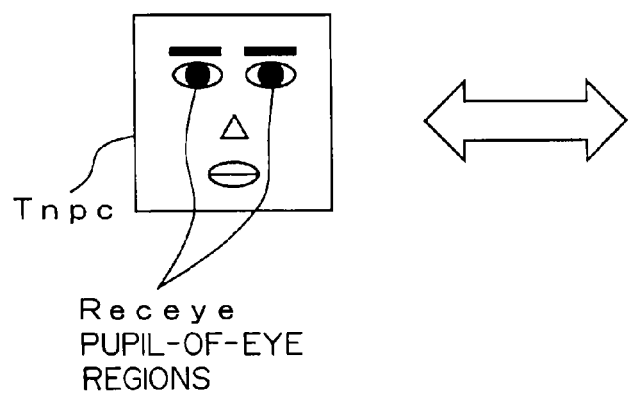
FIGS. 15A through 15C are illustrations each for explaining an operation example of an eye-direction-detecting section.
Figure 15B:
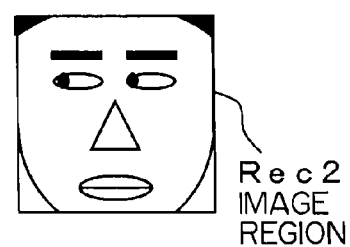
Figure 15C:

FIGS. 15A through 15C illustrate an operation example of the eye-direction-detecting section 226A or 226B shown in FIG. 7. The eye-direction-detecting section 226A or 226B detects an eye direction by utilizing pupil-of-eye-regions Receye in the standard face image template Tpnc as shown in FIG. 15A. It is supposed that the pupil-of-eye-regions Receye in the standard face image template Tpnc is previously extracted. Motion vectors are calculated in a set search extent of an image region Rec2 of the face image shown in FIG. 15B in regard to pixels corresponding to the pupil-of-eye-regions Receye. If an absolute value of the calculated motion vectors Vtr shown in FIG. 15C exceeds a predetermined threshold value, it is determined that the eye direction is different from the direction of face. It is then decided that a direction of the motion vectors Vtr is a new eye direction. If the absolute value of the calculated motion vectors Vtr shown in FIG. 15C does not exceed the predetermined threshold value, it is decided that a direction of face extracted in the face-image-discriminating portion 2250 of the face-region-extracting section 224A or 224B is an eye direction.

The display-direction-deciding section 228 shown in FIG. 7 decides a direction to which the input image relative to the image signal SDin is displayed based on the first and second eye directions indicating a feature value of the images and generates and outputs the display direction information JP. For example, FIGS. 16A through 16C respectively show operation examples of image displays. In this embodiment, as shown in FIG. 16A, if an eye direction (right direction in a frame F(11)) is detected from an image relative to the delayed image signal SDa and no eye direction is detected from an image of a frame F(12) relative to the image signal SDin, the image relative to the image signal SDin is displayed based on the detected eye direction relative to the delayed image signal SDa. In this embodiment, the image relative to the delayed image signal SDa is displayed on the screen 110C and the image relative to the image signal SDin is displayed on the screen 110R.

As shown in FIG. 16B, if no eye direction is detected from an image in a frame F(13) relative to the delayed image signal SDa and an eye direction (left direction in a frame F(14)) is detected from an image relative to the image signal SDin, the image relative to the image signal SDin is displayed so that the eye direction relative to the image signal SDin can meet a display position of the image relative to the delayed image signal SDa. In this embodiment, the image relative to the delayed image signal SDa is displayed on the screen 110C and the image relative to the image signal SDin is displayed on the screen 110R.

As shown in FIG. 16C, if eye directions are detected in both of an image in a frame F(15) relative to the delayed image signal SDa and an image in a frame F(16) relative to the image signal SDin, the eye direction detected from an image relative to the delayed image signal SDa is employed with priority. In this moment, if an eye direction up and to the right is detected from an image relative to the delayed image signal SDa and an eye direction down and to the left is detected from an image relative to the image signal SDin, namely, if the eye direction detected from the image relative to the delayed image signal SDa and the eye direction detected from the image relative to the image signal SDin are met to each other, the display-direction-deciding section 228 can change their display positions vertically. For example, the display-direction-deciding section 228 changes their display positions so that the image relative to the delayed image signal SDa in which the eye direction up and to the right is detected can be displayed on a lower portion of the screen 110C and the image relative to the image signal SDin in which the eye direction down and to the left is detected can be displayed on an upper portion of the screen 110R. This enables the images relative to the delayed image signal SDa and the image signal SDin to be respectively disposed to each other's eye direction.

Thus, the embodiment of the apparatus 120 of processing the image according to the invention contains the before-and-after-scene-change-relation-determining unit 124 that determines the display position of the image after the scene change to the display position associated with the image before the scene change and also detects the eye direction(s) of the images before and after the scene change to determine the display position of the image after the scene change based on the eye direction(s).

By the embodiment of the apparatus 120 of processing the image according to the invention, it is thus possible for a viewer to grasp the scene change easily and to grasp a relation between the images before and after the scene change easily based on the eye direction(s) in the images.

Figure 17:
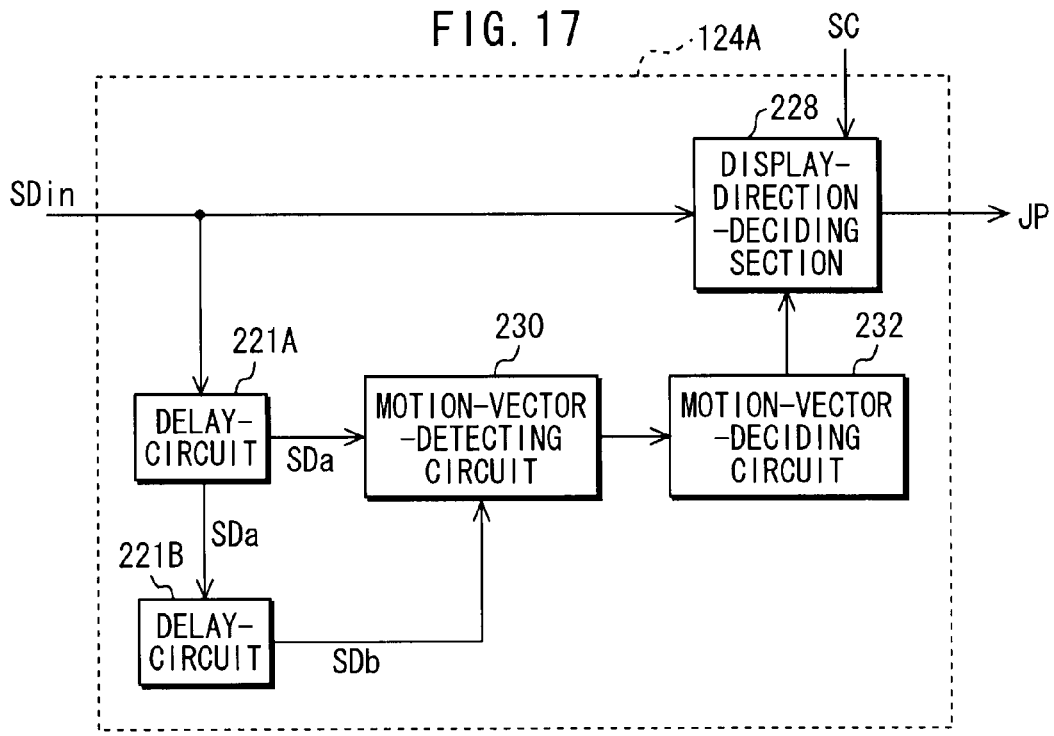
FIG. 17 is a block diagram for showing another configuration of the before-and-after-scene-change-relation-determining unit.

FIG. 17 shows a configuration of a before-and-after-scene-change-relation-determining unit 124A. The before-and-after-scene-change-relation-determining unit 124A contains delay circuits 221A and 221B, a motion-vector-detecting circuit 230, a motion-vector-deciding circuit 232, and a display-direction-deciding section 228.

The delay circuit 221A receives the image signal SDin relative to input image and delays the image signal SDin by one frame to generate a delayed image signal SDa. The delay circuit 221A supplies the delayed image signal SDa to the delay circuit 221B. The delay circuit 221B receives the delayed image signal SDa and delays the delayed image signal SDa by one frame to generate a delayed image signal SDb. The delay circuits 221A and 221B supply the motion-vector-detecting circuit 230 with the delayed image signals SDa and SDb. The motion-vector-detecting circuit 230 then detects motion vectors from the delayed image signals SDa and SDb. In order to detect the motion vectors, for example, the delayed image signal SDa is classified into blocks each of 8×8 pixels and a position in a desired search area of the delayed image signal SDb so that a sum of absolute values of differences becomes minimum is detected as the motion vector. The motion-vector-detecting circuit 230 then supplies the detected motion vectors to the motion-vector-deciding circuit 232.

The motion-vector-deciding circuit 232 receives the motion vectors from the motion-vector-detecting circuit 230 and decides a predetermined motion vector indicating the feature value between the images from the received motion vectors. For example, the motion-vector-deciding circuit 232 generates histograms of all of the received motion vectors, defines the motion vector having the most frequencies in the histogram of the image as motion vector of a background, and defines the motion vector having the second most frequencies on the histogram of the image as motion vector of a major object. The motion-vector-deciding circuit 232 supplies the motion vector having the second most frequencies to the display-direction-deciding section 228. In this moment, if the motion vector having the most frequencies in histogram of the image is almost same in number as the motion vector having the second most frequencies in the histogram of the image, the motion-vector-deciding circuit 232 can define the motion vector having the third most frequencies in the histogram of the image as the motion vector of the major object. If the motion vector having the most frequencies in histogram of the image occupies a total number of the motion vectors, the motion-vector-deciding circuit 232 can define such a condition as no motion condition.

The display-direction-deciding section 228 decides a display direction of the input image relative to the image signal SDin based on the motion vector decided in the motion-vector-deciding circuit 232. Namely, as shown in FIG. 2B, for example, the motion vector Vtr that has the second most frequencies in the histogram of the image indicates a motion (display) direction of the major object before the scene change relative to the image signal SDin. The display-direction-deciding section 228 generates display direction information JP so that the image Hd relative to the image signal SDin can be displayed to the display direction.

Thus, another embodiment of the apparatus 120 of processing the image according to the invention contains such the before-and-after-scene-change-relation-determining unit 124A that determines the display position of the image after the scene change to the display position associated with the image before the scene change and also detects the motion vector in the image before the scene change to determine the display position of the image after the scene change based on the motion vector.

By this embodiment of the apparatus 120 of processing the m image according to the invention, it is thus possible for a viewer to grasp the scene change easily and to grasp a relation between the images before and after the scene change easily based on the motion vector in the image.

Figure 18:
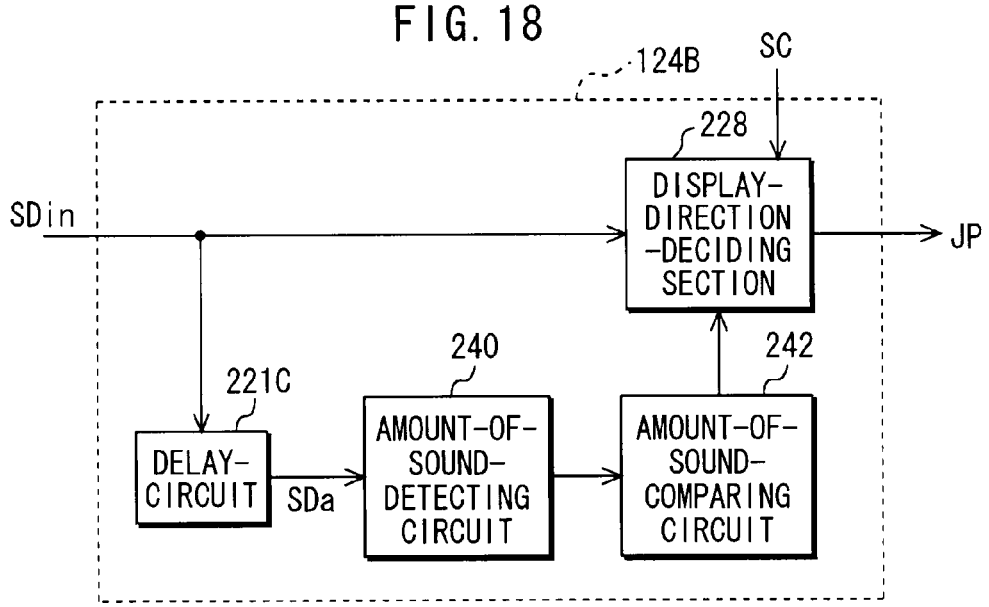
FIG. 18 is a block diagram for showing further configuration of the before-and-after-scene-change-relation-determining unit.

FIG. 18 shows a configuration of a before-and-after-scene-change-relation-determining unit 124B. The before-and-after-scene-change-relation-determining unit 124B contains a delay circuit 221C, an amount-of-sound-detecting circuit 240, an amount-of-sound-comparing circuit 242, and a display-direction-deciding section 228.

The delay circuit 221 and the display-direction-deciding section 228 receive the image signal SDin relative to input image. The delay circuit 221 delays the image signal SDin by one frame to generate a delayed image signal SDa. The delay circuit 221 supplies the delayed image signal SDa to the amount-of-sound-detecting circuit 240. The amount-of-sound-detecting circuit 240 detects an amount of sound of the audio signal, which has plural audio channels, accompanying with the delayed image signal SDa. It is to be noted that in order to facilitate the description in this embodiment, the audio signal is supposed to be overlapped with an image signal SDin and relates to two-channel stereo sound.

The amount-of-sound-detecting circuit 240 detects an amount of sound of the audio signal for each of the stereo two channels and then supplies information on the detected amount of sound to the amount-of-sound-comparing circuit 242.

The amount-of-sound-comparing circuit 242 calculates an absolute value of the differences between amounts of sound in the right and left audio channels of the two-channel stereo audio detected in the amount-of-sound-detecting circuit 240 and compares the absolute value of the differences indicating a feature value of the images with a predetermined threshold value. If the absolute value of the differences exceeds the predetermined threshold, it is determined that there is any significant difference between the amounts of sound in the right and left audio channels. The amount-of-sound-comparing circuit 242 supplies the display-direction-deciding section 228 with information indicating a direction of the channel having larger amount of sound. If an amount of sound in the left channel L of the two-channel stereo audio is larger than that in the right channel R of the two-channel stereo audio, the amount-of-sound-comparing circuit 242 supplies the display-direction-deciding section 228 with information indicating a left direction while if an amount of sound in the right channel R of the two-channel stereo audio is larger than that in the left channel L of the two-channel stereo audio, the amount-of-sound-comparing circuit 242 supplies the display-direction-deciding section 228 with information indicating a right direction. If the absolute value of the differences does not exceed the predetermined threshold, it is determined that there is not any significant difference between the amounts of sound in the right and left audio channels, so that the process finishes.

The display-direction-deciding unit 228 decides a display direction of the image relative to the image signal SDin based on a determination result of the amount-of-sound-comparing circuit 242. For example, when receiving the information indicating a direction from the amount-of-sound-comparing circuit 242, the display-direction-deciding unit 228 outputs the direction in the received information as the display direction information JP of the input image relative to the image signal SDin. In this embodiment, for example, as shown in FIG. 2C, if there is any significant difference between the amounts of sound in the right and left audio channels of the two-channel stereo signal relative to the image before the scene change and an amount of sound in the right channel R of the two-channel stereo audio is larger than that in the left channel L of the two-channel stereo audio, the display-direction-deciding unit 228 outputs the right direction so that an image Hf relative to the image signal SDin can be displayed on the right screen 110R as shown in FIG. 2C.

Although each of the delay circuits 221, 221A, 221B, and 221C has delayed the image signal SDin or the like by one frame, the number of the frames to be delayed may be set to optional one unless a delayed point of time is far away from a point of time of the scene change. The frame from which the amount of sound is detected is not limited one frame. For example, an average of the amounts of sound relative to plural frames can be detected.

The audio signal may contain any optional channels except for monaural audio signal. For example, this invention is also applicable to a 5.1-channel surround audio signal. In this moment, the above-mentioned processing may be applied based on the difference between the amounts of sound in the front two channels or rear two channels. Further, the above-mentioned processing may be applied based on the difference between the amounts of sound in the front two channels and the rear two channels.

Although the before-and-after-scene-change-relation-determining units 124, 124A, and 124B have thus been utilized the eye direction, the motion vector, and the amount of sound separately, a combination of any or all of the eye direction, the motion vector, and the amount of sound can be utilized in this embodiment. In this case, if the display position information JP relative to the eye direction is different from the display position information JP relative to the amount of sound, the display position information JP relative to the amount of sound may be preferentially employed. Alternatively, the display position information JP relative to the highest frequency of all of the decided directions may be employed.

Referring back to FIG. 3, the display-position-setting unit 126 receives the display size information JP from the display-direction-deciding section 228 of the before-and-after-scene-change-relation-determining unit 124, 124A or 124B and sets the display position of the input image relative to the image signal SDin decided in the before-and-after-scene-change-relation-determining unit 124, 124A or 124B based on the display direction information JP of the input image. The display-position-setting unit 126 then supplies image signals corresponding to projectors 112L, 112C, and 112R to signal output units 142L, 142C, and 142R, respectively.

It is to be noted that if there is no set display position of the input image, for example, if an image of a next scene is displayed to the right side when an image of the current scene is displayed on the right screen 110R, the image of the next scene is displayed on the right screen 110R.

If a display position is not changed even when the scene changes, the display position may be returned to the central screen 110C or may be kept in the current screen.

If a display position is changed when the scene changes, the image before the scene change may be kept as to be displayed as a still image. This enables the relation between the images before and after the scene change to be more understandable.

Thus, further embodiment of the apparatus 120 of processing the image according to the invention contains such the before-and-after-scene-change-relation-determining unit 124B that determines the display position of the image after the scene change to the display position associated with the image before the scene change and also detects the amount of sound in the image before the scene change to determine the display position of the image after the scene change based on the amount of sound.

By this embodiment of the apparatus 120 of processing the image according to the invention, it is thus possible for a viewer to grasp the scene change easily and to grasp a relation between the images before and after the scene change easily based on the amount of sound in the image, thereby enabling the image presentation to be easy to understand.

FIG. 19 shows a configuration of an embodiment of the apparatus 120A of processing an image according to the invention when performing processing in an off-line mode. Like reference characters of the apparatus 120 of processing an image as shown in FIG. 3 refer to like elements of the apparatus 120A of processing an image as shown in FIG. 19, detailed explanation of which will be thus omitted.

A storage unit 130 in the apparatus 120A of processing an image receives and stores the image signal SDin relative to the input image. The storage unit 130 also supplies the stored image signal SDin to the scene-change-detecting unit 121.

Similar to the above case of performing processing in the real time mode, the scene-change-detecting unit 121 detects the scene change and the before-and-after-scene-change-relation-determining unit 124 (124A, 124B) determines a display position of the image after the scene change to a display position associated with the image before the scene change. The display-position-setting unit 126 then sets the display position of the image after the scene change to the display position associated with the image before the scene change that has been determined and supplies the display position information JC on the input image relative to the image signal SDin for displaying the image after the scene change to the storage unit 130. The storage unit 130 adjusts the display position of the image to be displayed completely based on the received display position information JC for each scene and supplies image signals relative to the adjusted display position to the signal output units 142L, 142C, and 142R.

Figure 20:
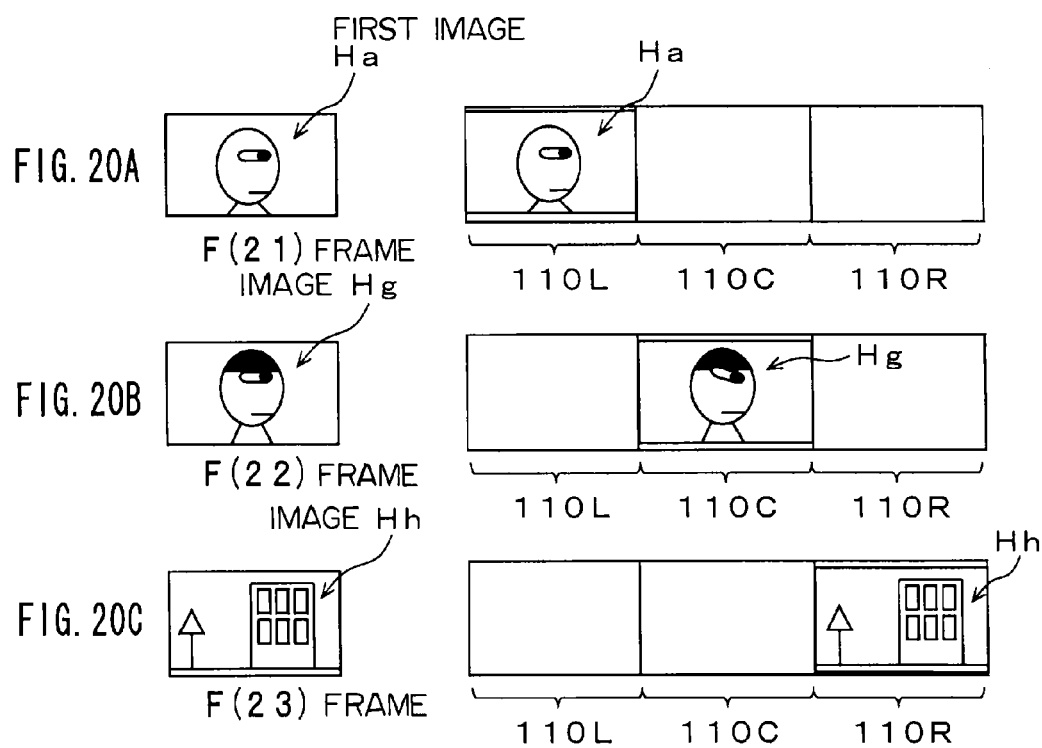
FIG. 20A is a diagram for showing contents in a frame and an image when the frame is displayed on a screen.
FIG. 20B is a diagram for showing contents in a frame and an image when the frame is displayed on a screen.
FIG. 20C is a diagram for showing contents in a frame and an image when the frame is played on a screen.

FIGS. 20A through 20C show the image display operation examples. As shown in FIG. 20A, if the display positions of the images before and after the scene change are changed in succession, namely, if the display positions of the image Hg shown in FIG. 20B and the image Hh shown in FIG. 20C are changed to right direction and to right direction in succession, an controller, not shown, of the storage unit 130 sets a display position of a first image Ha to the left screen 110L so that the images Ha, Hg, and Hh can be displayed in succession. This also enables any successive display position changes to be realized.

Thus, by the embodiment of the apparatus 120A of processing the image according to the invention, it is possible for viewer to understand a relation between the scenes by changing the display positions of the images based on the relation between the images before and after the scene change. In a case of performing processing in an off-line mode, it is possible to handle the successive display position changes, thereby enabling a viewer to understand the scene change easier. It is also possible to keep displaying the image before the scene change as a still image, thereby enabling a viewer to understand the scene change further easier.

Figure 21:
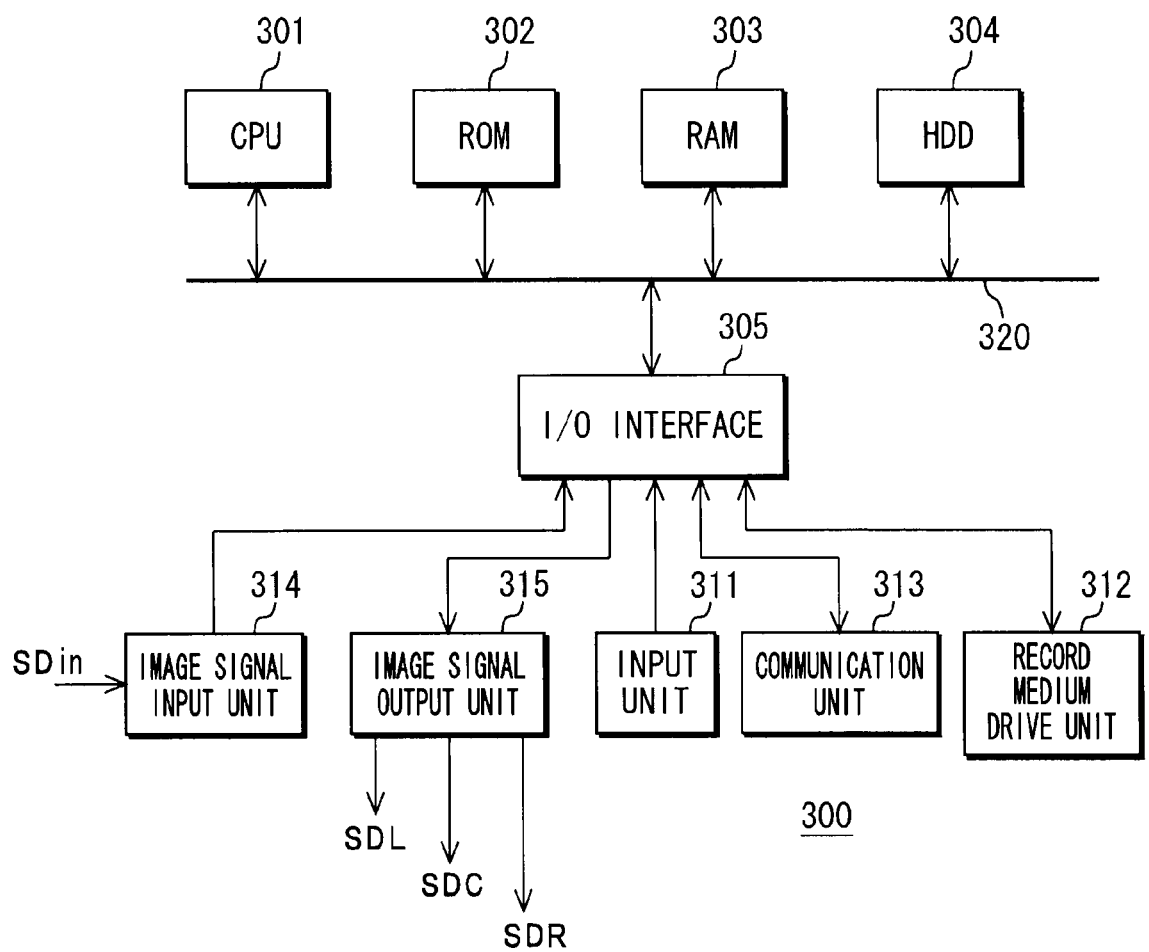
FIG. 21 is a block diagram for showing a configuration of a computer to which an embodiment of the invention is applicable.

In addition to the above hardware, any software can also implement the above processing. FIG. 21 shows a configuration of an embodiment of a computer 300 to which an embodiment according to the invention is applicable. The computer 300 contains a central processing unit (CPU) 301. To the CPU 301, a read only memory (ROM) 302, a random access memory (RAM) 303, a hard disk drive (HDD) 304, and an input/output interface 305 are connected through a bus 320. To the input/output interface 305, an input unit 311, a record medium drive unit 312, a communication unit 313, an image signal input unit 314, and an image signal output unit 315 are connected.

When external equipment sends any commands to the computer 300 or the input unit 311 constituted of manipulation device such as a keyboard and a mouse or audio input device such as a microphone inputs any commands, these commands are supplied to the CPU 301 through the input/output (I/O) interface 305.

The CPU 301 carries out any programs stored in the ROM 302, the RAM 303, and/or the HDD 304 and performs any processing based on the received commands. The ROM 302, the RAM 303, and/or the HDD 304 previously store any image-processing programs that allow the computer 300 to carry out any processing similar to the above-mentioned apparatus of processing an image. The CPU 301 controls the ROM 302, the RAM 303, and/or the HDD 304 to read information out thereof based on the input image signal SDin that the image signal input unit 314 receives and to generate output signals SDL, SDC, and SDR and transmits the output signals SDL, SDC, and SDR through the image signal output unit 315. The record medium may store such the image-processing programs. The record medium drive unit 312 records the image-processing programs on the record medium or reads the image-processing programs out of the record medium, thereby enabling the computer 300 to carry out the image-processing programs. The communication unit 313 may transmit and receive the image-processing programs through any transmission path, thereby enabling the computer 300 to carry out the received image-processing programs.

Figure 22:
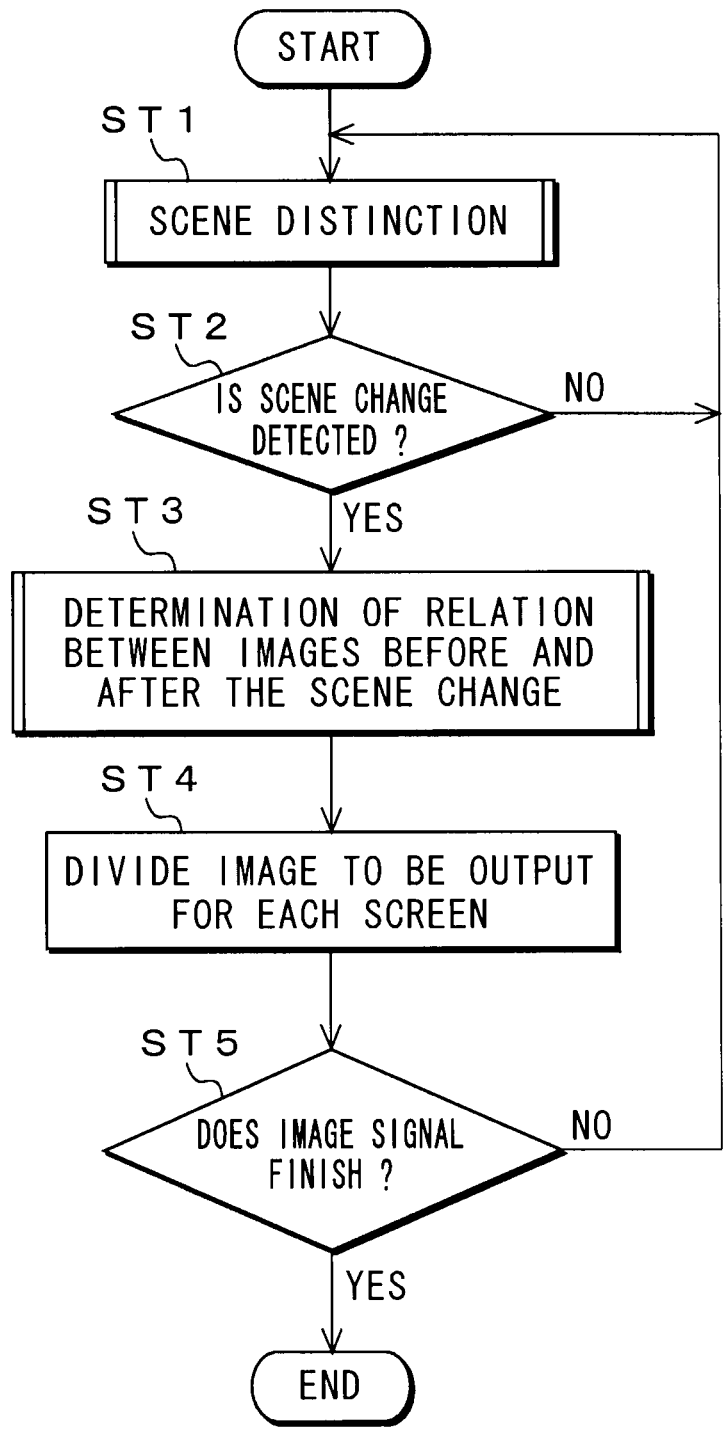
FIG. 22 is a flowchart for showing a whole configuration of an image-processing program in a case of performing processing in a real time mode.
Figure 23:
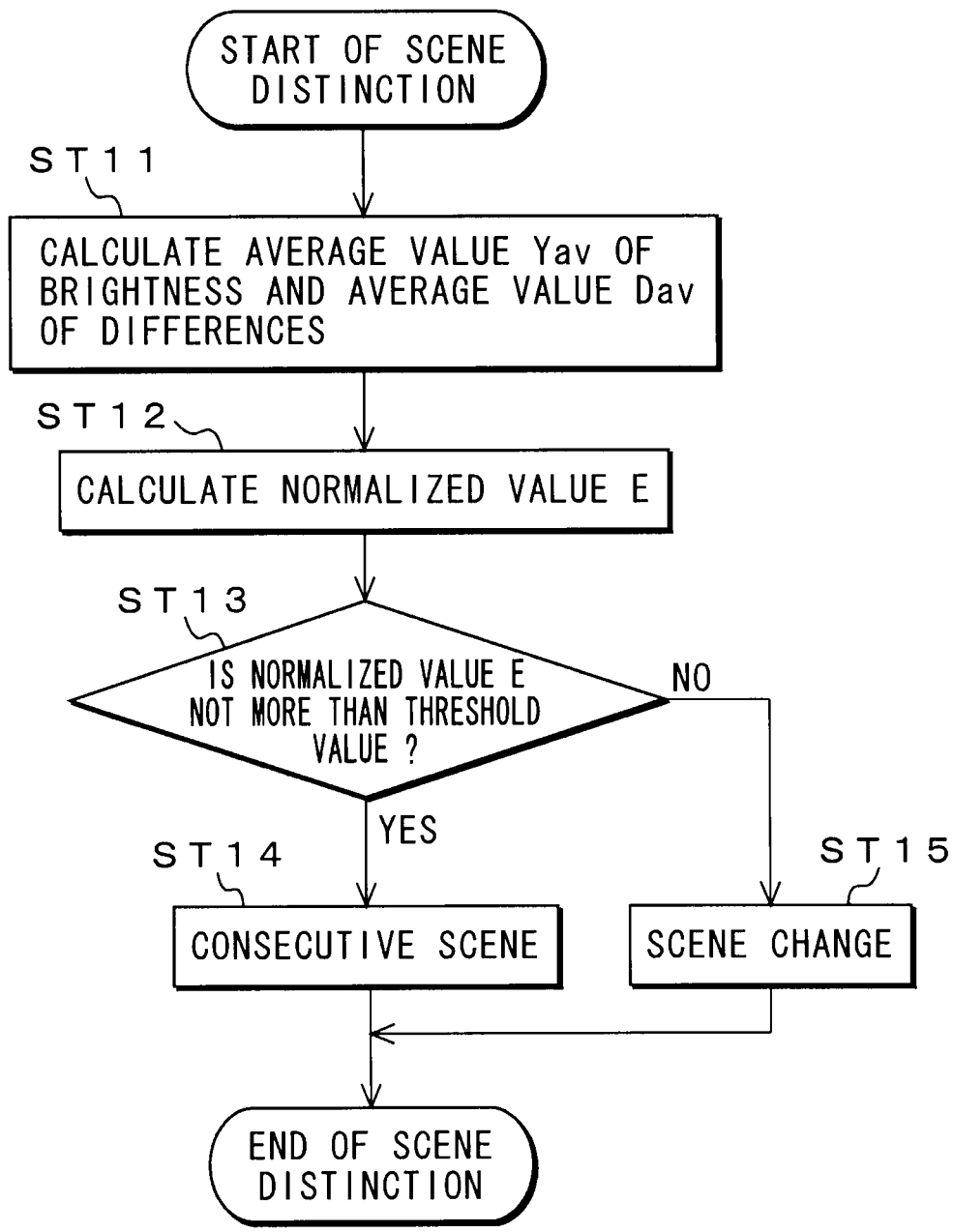
FIG. 23 is a flowchart for showing an operation of scene distinction.

FIG. 22 shows a whole configuration of an image-processing program in a case of performing processing in a real time mode. At step ST1 shown in FIG. 22, a scene is distinguished. FIG. 23 shows an operation example of such the scene distinction. At step ST 11 shown in FIG. 23, an average value Dav of differences between the frames and an average value Yav of brightness in each frame are calculated and the process goes to step ST 12. At the step ST 12, the average value Dav of differences is normalized using the average value Yav of brightness so that the normalized value E can be calculated.

At step ST 13, by comparing the normalized value E with a threshold value, it is determined whether or not there is a scene change. If the normalized value E does not exceed the threshold value, the process goes to step ST 14 where it is determined that there is no scene change and the images are contained in the same scene. If the normalized value E exceeds the threshold value, the process goes to step ST15 where it is determined that there is a scene change. Thus, the scene distinction is carried out based on the normalized value E.

Alternatively, in the operation of the scene distinction, as described above, the correlation coefficient r may be calculated and the scene change may be detected by comparing the correlation coefficient r with a threshold value. In this case, in place of the steps ST 11 and ST 12, the correlation coefficient r is calculated according to the above-mentioned expression (4). In place of the step ST13, by comparing the correlation coefficient r with the threshold value, it is determined whether or not there is a scene change. If the correlation coefficient r is not less than the threshold value, the process goes to step ST 14 where it is determined that there is no scene change and the images are contained in the same scene. If the normalized value E is less than the threshold value, the process goes to step ST 15 where it is determined that there is a scene change.

Referring back to FIG. 22, at step ST 2, it is determined whether or not a scene change is detected. If it is determined that the scene change is not detected, the process goes back to step ST 1. If it is determined that such a scene change is detected at the step ST 2, the process goes to the step ST 3. At the step ST 3, what is a relation between the images before and after the scene change is determined.

Figure 24:
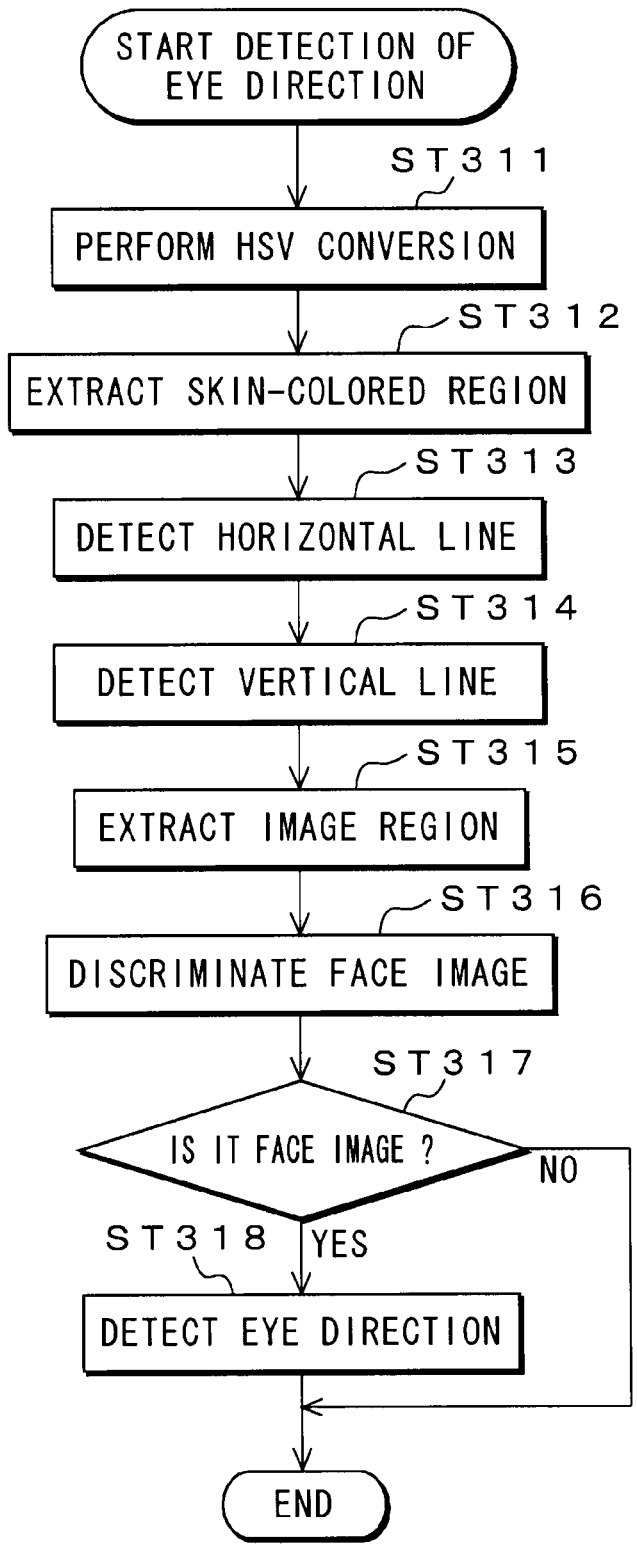
FIG. 24 is a flowchart for showing a before-and-after scene-change-relation-determining operation by means of an eye direction.

FIG. 24 shows an operation example of determination of the relation between the images before and after the scene change based on the eye direction in the step ST 3. At step ST 311 shown in FIG. 24, HSV conversion is performed on the image signal SDin relative to the input image. At step ST 312, a region having a predetermined value of hue is extracted from the image thus HSV-converted. At step ST 313, the value of the maximum successive pixels in a horizontal line direction is extracted from the extracted region. This position of the horizontal line is set as a vertical reference point and a value obtained by performing a predetermined calculation on the numbers of the successive pixels is detected as the horizontal line.

At step ST 314, a length of the vertical line is obtained by performing a predetermined calculation on the value of the horizontal line detected at the step ST313 based on the vertical reference point. At step ST 315, an image region boxed by a box having the horizontal line detected in the step ST 313 and the vertical line detected in the step ST 314 is extracted. At step ST 316, the image region extracted in the step ST 315 is compared with a standard face image template, which has been previously prepared, to discriminate whether m or not this is a face image. In this moment, the standard face image templates having different directions of face are prepared and thus, a direction of face is discriminated in addition to the discrimination of the face image. At step ST 317, it is determined whether or not the face image is detected. If the face image is detected, the process goes to step ST 318 where the eye direction is detected from the motion vector in the pupil-of-eye-regions in the standard face image template and then, the detected eye direction is set as the display position of the image after the scene change. If no face image is detected, the process finishes.

Figure 25:
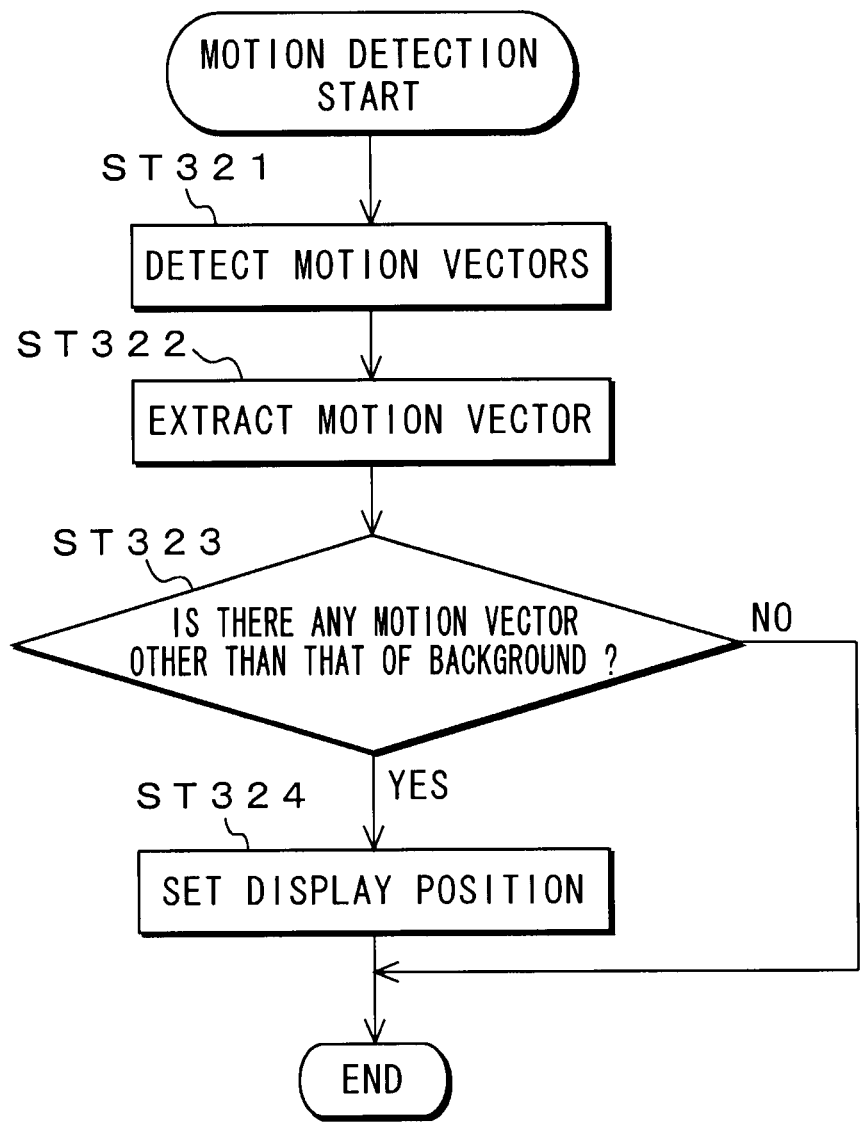
FIG. 25 is a flowchart for showing a before-and-after scene-change-relation-determining operation by means of motion vector.

FIG. 25 shows an operation example of determination of the relation between the images before and after the scene change based on the motion vector in the step ST 3. At step ST 321, motion vectors are detected between the input image of a current frame and the input image of a frame just before the current frame for each block of, for example, 8×8 pixels. At step ST 322, the motion vector having the most frequencies in the histogram of the image is defined as motion vector of a background, and the motion vector having the second most frequencies on the detected histogram of the image is defined as motion vector of a major object. The motion vector having the second most frequencies is extracted from the detected motion vectors. At step ST 323, a rate of the numbers of the motion vectors having the second most frequencies to a total number of the motion vectors is checked. If the numbers of the motion vectors having the second most frequencies are sufficient to the total number of the motion vectors, it is determined that there is any motion vector other than that of the background. The process then goes to step ST 324. If the numbers of the motion vectors having the second most frequencies are insufficient to the total number of the motion vectors, it is determined that there is no motion vector other than that of the background. The process then finishes. At step ST 324, a direction of each of the motion vectors having the second most frequencies is set as the display position of the image after scene change.

Figure 26:
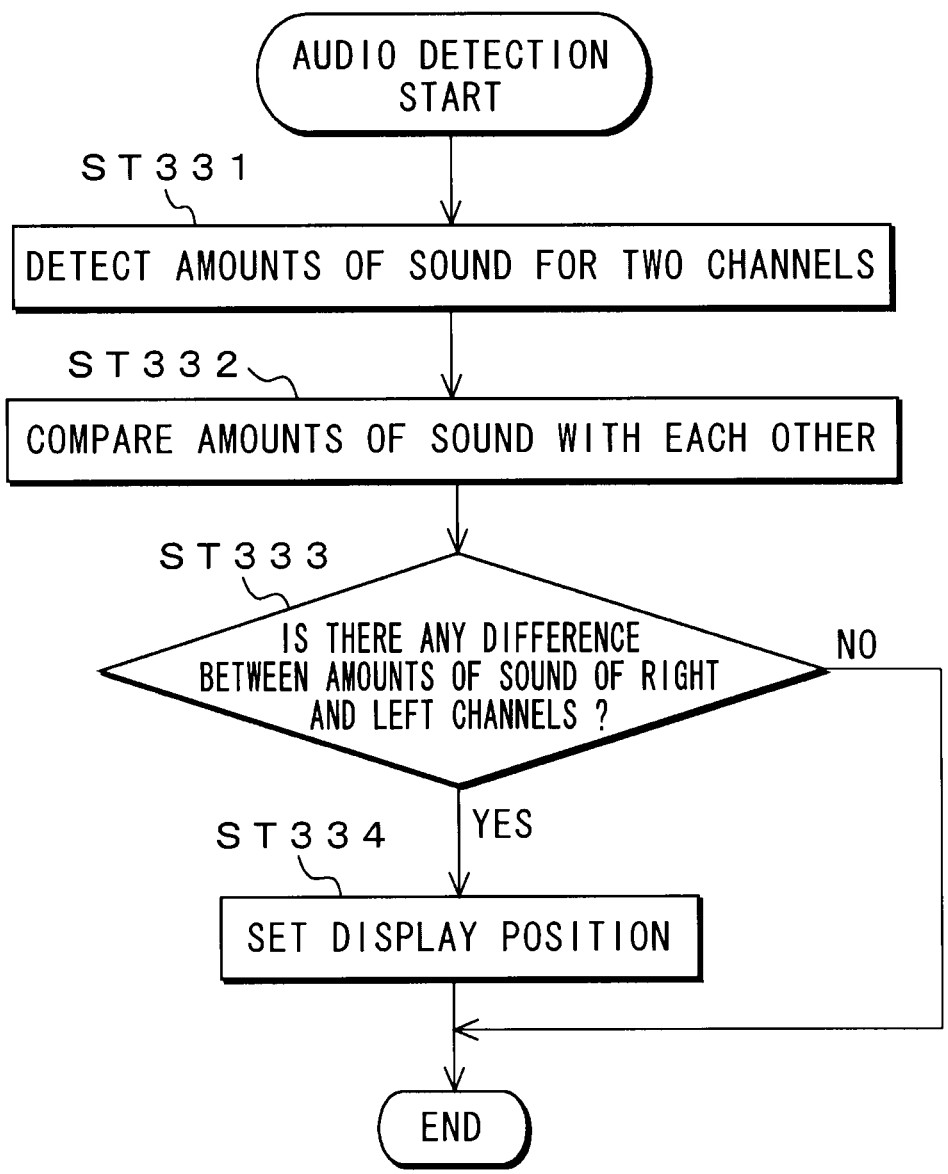
FIG. 26 is a flowchart for showing a before-and-after scene-change-relation-determining operation by means of an amount of sound.

FIG. 26 shows an operation example of determination of the relation between the images before and after the scene change based on the amounts of sound in the step ST 3. At step ST 331, the amounts of sound for right and left channels are detected from an input stereo two-channel audio signal. At step ST 332, the detected amounts for right and left channels are compared with each other. At step ST 333, it is determined whether or not there is any difference between the amounts of sound of the right and left channels. If there is any difference, the process goes to step ST 334 where a direction of the channel having larger amount of sound is determined as the display position of the image after the scene change. If there is no difference, the process then finishes.

Referring back to FIG. 22, at step ST 4, the output signals SDL, SDC, and SDR for displaying the images on the display position determined in the step ST 3 are generated. In the generation of the output signals, the images are stored in a frame memory and the image signal is read out of the frame memory at a timing based on the display position of the image so that the read image signal can be divided for each screen, thereby enabling the output signals SDL, SDC, and SDR to be generated. Alternatively, the image signals are stored in a memory in which record regions correspond to image display regions, according to their display positions, and a signal stored in the record region corresponding to each screen is used, thereby enabling the output signals SDL, SDC, and SDR to be generated.

The process then goes to step ST 5. At the step ST 5, it is determined whether or not the image signal relative to the input image finishes. If it is determined that the image signal does not finish, the process goes back to the step ST1 where such the image processing is repeated. If it is determined that the image signal finishes, the image processing finishes.

Figure 27:
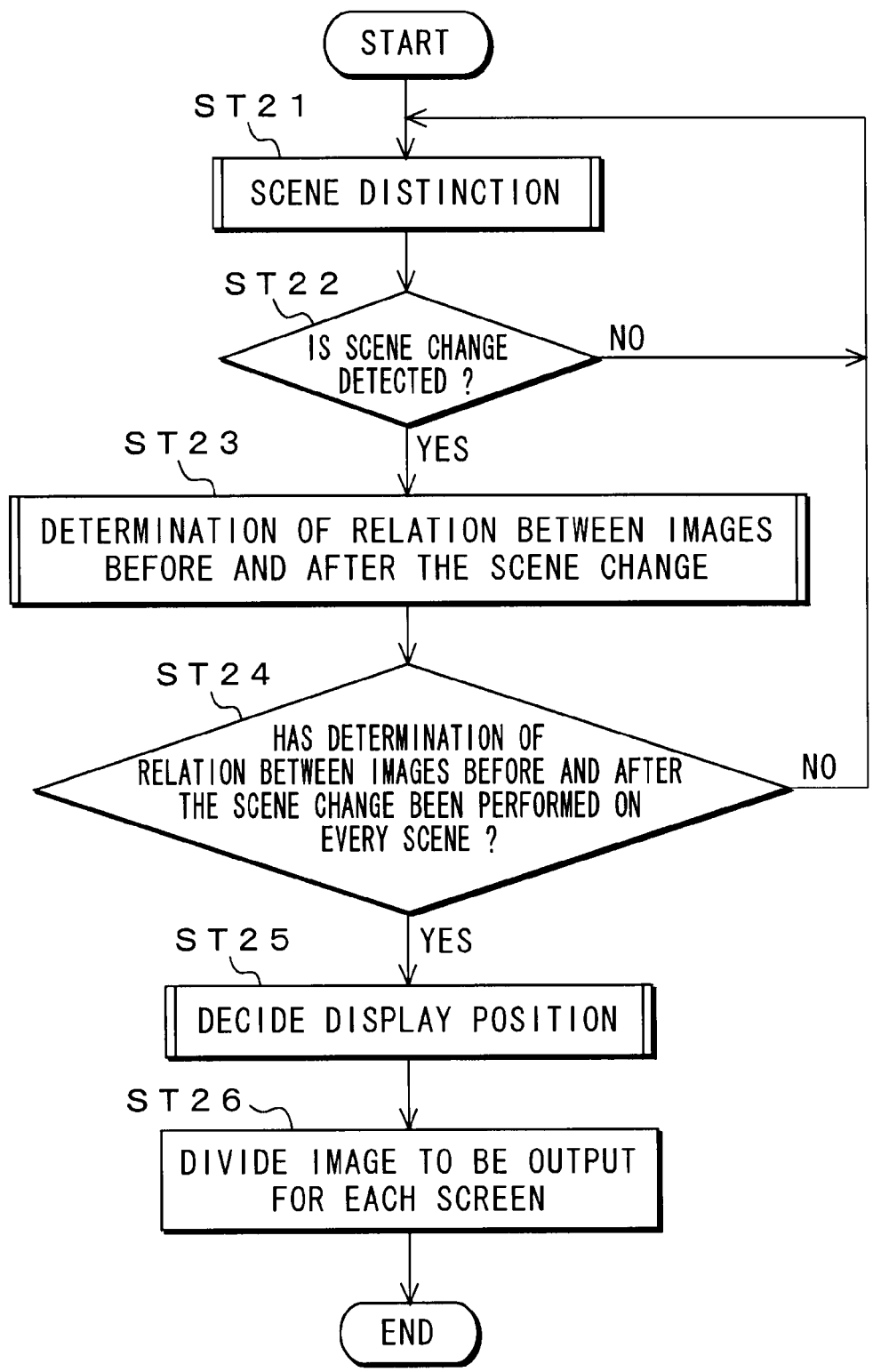
FIG. 27 is a flowchart for showing a whole configuration of an image-processing program in a case of performing processing in an off-line mode.

FIG. 27 shows a whole configuration of an image-processing program in a case of performing processing in an off-line mode.

At step ST 21 shown in FIG. 27, a scene is distinguished. At step ST 22, it is determined whether or not a scene change is detected. If it is determined that no scene change is detected at the step ST 22, the process goes back to the step ST 21. If it is determined that such a scene change is detected at the step ST 22, the process goes to step ST 23 where the relation between the images before and after the scene change is determined.

At step ST 24, it is determined whether or not the determination of relation between the images before and after the scene change has been performed on every scene. If it is determined that the determination of relation between the images before and after the scene change has not yet performed on every scene at the step ST 24, the process goes back to the step ST21 to continue the process. If it is determined that the determination of relation between the images before and after the scene change has been performed on every scene at the step ST24, the process goes to step ST25.

At the step ST25, a case such that display positions are changed in succession is extracted from the display positions determined before and after every scene and the display positions are set so that the display positions can be changed in succession.

At step ST26, the output signals SDL, SDC, and SDR are generated so that the images can be displayed on the display position determined in the step ST 25. In the generation of the output signals, the images are stored in a frame memory and the image signal is read out of the frame memory at a timing according to the display positions of the images so that the read image signal is divided for each screen, thereby enabling the output signals SDL, SDC, and SDR to be generated. Alternatively, the image signal is stored in a memory in which record regions correspond to image display regions, according to their display positions, and a signal stored in the record region corresponding to each screen is used, thereby enabling the output signals SDL, SDC, and SDR to be generated.

Thus, in the embodiments of the method of processing the image and the image processing program product according to the invention, a feature value of the images before and after the scene change is detected and the display position after the scene change is determined based on the feature value of the images. In these embodiments, the eye direction, the motion vector, and the amounts of sound are used as the feature value of the images.

Accordingly, it is possible for a viewer to grasp the scene change easily and to grasp the relation between the images before and after the scene change easily from the contents in the images. This enables an image presentation that is easy to understand to be realized.

It is to be noted that although the screens and the projectors have been illustrated in the above embodiments, their numbers and size of the screen and the like can be changed optionally. Another kind of display such as a wide screen display or a curved surface display, for example, a cylindrical display, can be used.

Although the apparatus 120A of processing an image has contained the storage unit 130 therein in the above embodiment, any external information storage device may be used. When the storage unit 130 is detachable, another image display system having any image display control function can also display the images having any reality and easy to be understandable, by utilizing the image signal SDin and the display position information JC that are stored in this detachable storage unit 130.

According to the above embodiments of the invention, the image after the scene change can be displayed on the display position by using an image signal on existing contents without creating new image source and/or another format, thereby enabling to be displayed the image having any more impact than an previous image and easy to be understandable.

Figure 28:
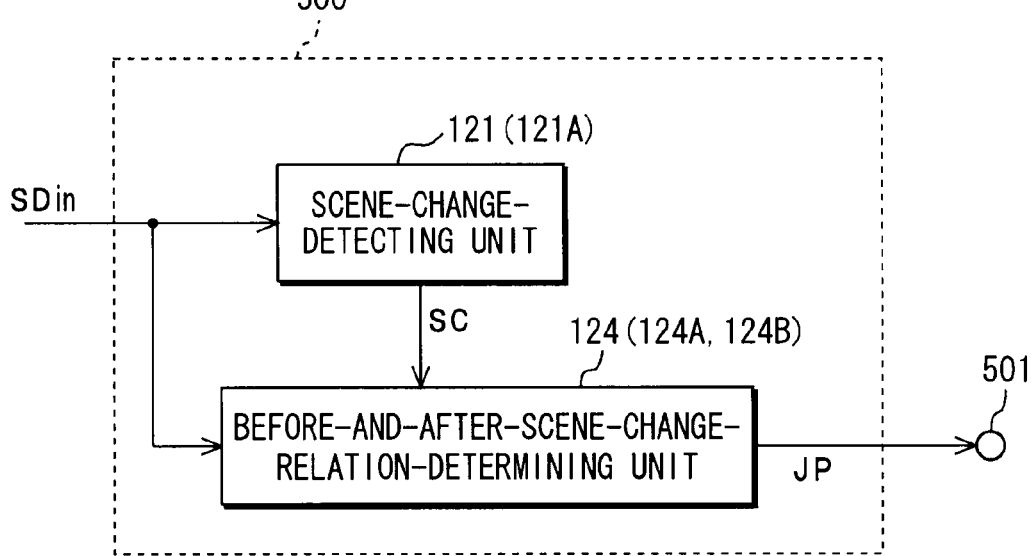
FIG. 28 is a block diagram for showing a configuration of an embodiment of an apparatus of generating reproduction information according to the invention.
Figure 29:
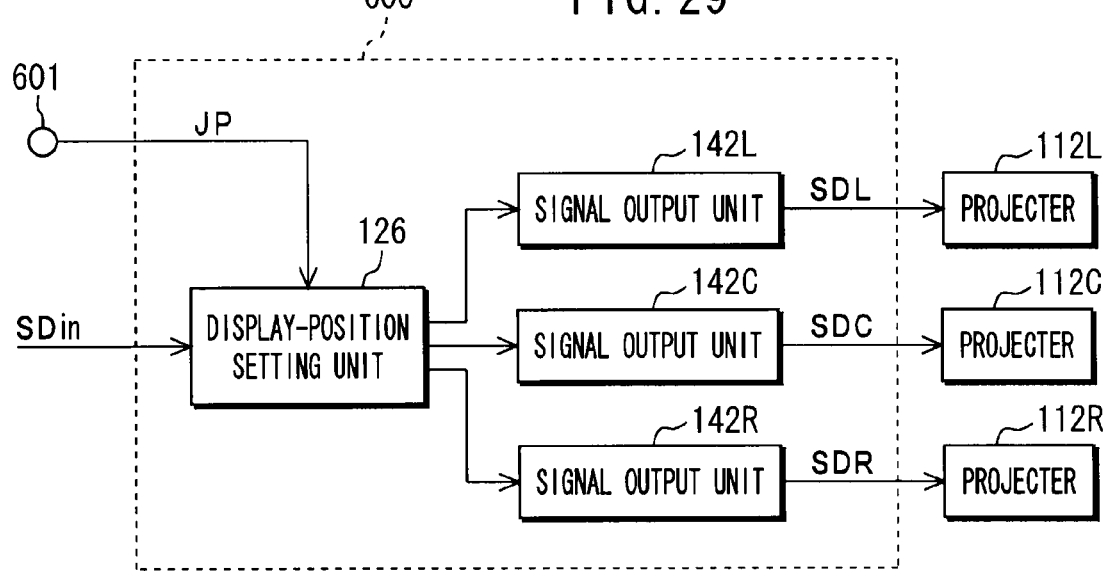
FIG. 29 is a block diagram for showing a configuration of information-reproducing apparatus.

The following will describe embodiments of an apparatus and a method of generating reproduction information as well as a reproduction information generating program product according to the invention with reference to FIGS. 28 through 30. FIG. 28 shows a configuration of an embodiment of the apparatus 500 of generating reproduction information according to the invention and FIG. 29 shows a configuration of the apparatus 600 of reproducing information. Like reference characters of the apparatus 120 of processing an image as shown in FIG. 3 refer to like elements of these apparatuses 500 and 600, detailed explanation of which will be thus omitted.

The apparatus 120 of processing an image is divided to configure these apparatuses 500 and 600. The apparatus 500 of generating reproduction information performs any processing on the image signal SDin relative to the input image and generates the display position information JP of frames that are an example of reproduction information on the video. The apparatus 500 of generating reproduction information contains a scene-change-detecting unit 121 (121A) and a before-and-after-scene-change-relation-determining unit 124 (124A and 124B). The apparatus 600 of reproducing information performs any processing on the image signal SDin based on the display position information JP and reproduces the images.

The scene-change-detecting unit 121 in the apparatus 500 of generating reproduction information shown FIG. 28 receives the image signal SDin, detects a scene change in the frames based on the image signal SDin to generate the scene-change-detecting signal SC, and supplies the scene-change-detecting signal SC to the before-and-after-scene-change-relation-determining unit 124.

When receiving the scene-change-detecting signal SC, the before-and-after-scene-change-relation-determining unit 124 determines the relation between the images before and after the scene change based on the face direction and/or eye direction indicating the feature value of the images and transmits the display position of the input image as the display position information JP to an output terminal 501.

The output terminal 501 may connect an external storage medium, not shown, such as USB memory, which stores the display position information JP. This enables to be presented the display position information JP for indicating the display position of each scene. Further, the terminal 501 may also connect a telecommunications line such as a local area network (LAN) cable. For example, the display position information JP is downloaded to a user's personal computer (PC) through the Internet communication network.

The apparatus 600 of reproducing information shown in FIG. 29 reads the display position information JP out of the external storage medium or obtains the display position information JP through the Internet, and performs any processing on the image signal SDin relative to the input image based on the display position information JP to reproduce the images. The apparatus 600 of reproducing information contains a display-position-setting unit 126 and signal output units 142L, 142C, and 142R.

The display-position-setting unit 126 receives the display position information JP and the image signal SDin. The display-position-setting unit 126 then sets the display position of the input image relative to the image signal SDin based on the display position information JP and divides the image signal SDin to supply the divided signals to the signal output units 142L, 142C, and 142R, respectively.

The signal output units 142L, 142C, and 142R are constituted of image memories. When receiving the image signal SDin, the signal output unit 142L stores the image signal SDin successively on the image memory.

The image signal SDin is then read out of the signal output unit 142L and supplied to the projector 112L as the output signal SDL. When the divided image signal SDin is supplied, the signal output unit 142L stores the image signal in its image memory so that a part of the image signal including no contents is displayed in black on the screen.

The signal output units 142C and 142R have the same configuration as that of the signal output unit 142L and stores the image signal SDin successively on their image memories. The image signal SDin is then read out of the signal output units 142C and 142R and supplied to the projectors 112C and 112R, respectively, as the output signals SDC and SDR. When the divided image signal SDin is supplied, the signal output units 142C and 142R store the image signal in their image memories so that a part of the image signal including no contents is displayed in black on the screens.

FIG. 30 shows a generation example of the display position information in a case of performing processing in a real time mode, which indicates a reproduction-information-generating program.

At step ST 31 shown in FIG. 30, a scene is distinguished. At step ST 32, it is determined whether or not a scene change is detected. If it is determined that such a scene change is not detected, the process goes back to the step ST1. If it is determined that such a scene change is detected, the process goes to step ST3. At the step ST 3, a relation between the images before and after the scene change is determined. For example, the relation between the images before and after the scene change is determined based on the face direction and/or eye direction in the image, the motion vector of the image, and the difference between amounts of sounds of right and left channels in the image.

At step ST 34, the display position information JP on a display position of the image after the scene change is generated based on the relation between the images before and after the scene change, which has been determined in the step ST 33, and the process goes to step ST 35.

At the step ST 35, it is determined whether or not the image signal SDin relative to the input image finishes. If it is determined that the image signal SDin does not finish, the process goes back to the step ST1. If it is determined that the image signal finishes, the image processing finishes.

Thus, by the apparatus 500 of generating reproduction information, the method of generating reproduction information, and a program product therefor according to the above embodiments of the invention, the feature value of the images before and after the scene change is detected and the display position information Jp such that the display position of the image after the scene change is set to a display position associated with the image before the scene change based on the feature value is generated.

Accordingly, according to the embodiments of the invention, it is possible to grasp the scene change easily by reproducing the images based on the generated display position information JP, and it is also possible to grasp the relation between the images before and after the scene change based on the image contents. This enables the images to be understandably presented.

Thus, the apparatus and the method of processing an image and the program product of processing the image as well as the apparatus and the method of generating the reproduction information and the program product of generating the reproduction information according to the above embodiments of the invention are preferably applied to an apparatus and the like that process an image signal relative to the input image such as a television broadcast program and movie.

It should be understood by those skilled in the art that various modifications, combinations, sub-combinations and alternations may occur depending on design requirements and other coefficients insofar as they are within the scope of the appended claims or the equivalents thereof.

What is claimed is:

1. An apparatus of processing an image, the apparatus comprising: a scene-change-detecting unit that detects a scene change in an input video signal; a display-position-controlling unit that determines a display position of an image of the input video signal after the scene change in relation to a display position of an image of the input video signal before the scene change based on a detection result in the scene-change-detecting unit; and a display-position-setting unit that sets the display position determined in the display-position-controlling unit as a display position in which the image of the input video signal after the scene change is displayed, wherein the display-position-controlling unit detects an eye direction of a face region in the images of the input video signal before and after the scene change and determines the display position of the image of the input video signal after the scene change based on the eye direction of the face region in the images of the input video signal before and after the scene change, and wherein the display-position-controlling unit includes: a first face-region-extracting section that extracts the face region from the input video signal; a first eye-direction-detecting section that detects a first eye direction from the region of face image extracted in the first face-region-extracting section; a delay section that delays the input video signal to generate a delayed input video signal; a second face-region-extracting section that extracts a region of face image from the delayed input video signal received from the delay section; a second eye-direction-detecting section that detects a second direction of an eye direction from the region of face image extracted in the second face-region-extracting section; and a display-direction-deciding section that decides the display direction of the image of the input video signal after the scene change relative to the display position of the image of the input video signal before the scene change based on the first and second eye directions.

2. The apparatus according to claim 1, wherein the first face-region-extracting section includes: a skin-colored-region-extracting portion that extracts pixels of an image of the input video signal having a value within a set range and sets the pixels as a skin colored region; a horizontal-line-detecting portion that counts number of the pixels in the skin colored region extracted in the skin-colored-region-extracting portion on each horizontal line, and detects a horizontal line having a maximum number of the counted pixels to obtain a reference point from a position of the horizontal line having the maximum number of the counted pixels; a vertical-line-detecting portion that obtains a length of a vertical line from a length of the horizontal line detected in the horizontal-line-detecting portion and sets the reference point as middle of the vertical line; a frame-region-extracting portion that extracts a frame region in the image of the input video signal based on the horizontal line detected in the horizontal-line-detecting portion and the vertical line detected in the vertical-line-detecting portion; and a face-image-discriminating portion that contains a template for a set face image, calculates a difference value between the template and the frame region extracted in the frame-region-extracting portion, compares the difference value with a predetermined threshold value, and discriminates whether or not the frame region in the image of the input video signal is the face region based on a comparison result.

3. The apparatus according to claim 1, wherein the second face-region-extracting section includes: a skin-colored-region-extracting portion that extracts pixels of an image of the delayed input video signal having a value within a set range and sets the pixels as a skin colored region; a horizontal-line-detecting portion that counts number of the pixels in the skin colored region extracted in the skin-colored-region-extracting portion on each horizontal line, and detects a horizontal line having a maximum number of the counted pixels to obtain a reference point from a position of the horizontal line having the maximum number of the counted pixels; a vertical-line-detecting portion that obtains a length of a vertical line from a length of the horizontal line detected in the horizontal-line-detecting portion and sets the reference point as middle of the vertical line; a frame-region-extracting portion that extracts a frame region in the image of the delayed input video signal based on the horizontal line detected in the horizontal-line-detecting portion and the vertical line detected in the vertical-line-detecting portion; and a face-image-discriminating portion that contains a template for a set face image, calculates a difference value between the template and the frame region extracted in the frame-region-extracting portion, compares the difference value with a predetermined threshold value, and discriminates whether or not the frame region in the image of the delayed input video signal is the face region based on a comparison result.

4. The apparatus according to claim 1, wherein the display-position-controlling unit detects the eye direction of each face region in the images of the input video signal before and after the scene change and determines the display position of the image of the input video signal after the scene change based on the detected eye direction of each face region in the images of the input video signal before and after the scene change, and the apparatus further comprising a display unit that displays the input video signal according to the determined display position.

5. A method of processing an image, the method comprising: detecting a scene change in an input video signal; determining a display position of an image of the input video signal after the scene change in relation to a display position of an image of the input video signal before the scene change based on a detection result of the detecting; and setting the display position determined in the determining as a display position in which the image of the input video signal after the scene change is displayed, wherein in the determining, an eye direction of a face region in the images of the input video signal before and after the scene change is detected and the display position in which the image of the input video signal after the scene change is displayed is determined based on the eye direction of the face region in the images of the input video signal before and after the scene change, and the determining further includes: extracting the face region from the input video signal; detecting a first eye direction from the region of face image extracted in the extracting; delaying the input video signal to generate a delayed input video signal; extracting a second region of face image from the delayed image input video signal; detecting a second direction of an eye direction from the second region of face image; deciding the display direction of the input image of the input video signal after the scene change relative to the display position of the image of the input video signal before the scene change based on the first and second eye directions.

6. The method according to claim 5, wherein the determining includes detecting the eye direction of each face region in the images of the input video signal before and after the scene change and determining the display position of the image of the input video signal after the scene change based on the detected eye direction of each face region in the images of the input video signal before and after the scene change, and the method further comprising displaying the input video signal according to the determined display position.

7. A non-transitory computer readable storage medium storing instructions thereon, which, when executed by a computer, cause the computer to perform a method of processing an image, the method comprising: detecting a scene change in an input video signal; determining a display position of an image of the input video signal after the scene change in relation to a display position of an image of the input video signal before the scene change based on a detection result of the detecting; and setting the display position determined in the determining as a display position in which the image of the input video signal after the scene change is displayed, wherein in the determining, an eye direction of a face region in the images of the input video signal before and after the scene change is detected and the display position in which the image of the input video signal after the scene change is displayed is determined based on the eye direction of the face region in the images of the input video signal before and after the scene change, and the determining further includes: extracting the face region from the input video signal; detecting a first eye direction from the region of face image extracted in the extracting; delaying the input video signal to generate a delayed input video signal; extracting a second region of face image from the delayed input video signal; detecting a second direction of an eye direction from the second region of face image; deciding the display direction of the image of the input video signal after the scene change relative to the display position of the image of the input video signal before the scene change based on the first and second eye directions.

8. The non-transitory computer readable storage medium according to claim 7, wherein the determining includes detecting the eye direction of each face region in the images of the input video signal before and after the scene change and determining the display position of the image of the input video signal after the scene change based on the detected eye direction of each face region in the images of the input video signal before and after the scene change, and the method further comprising displaying the input video signal according to the determined display position.

9. An apparatus of generating reproduction information that processes an input video signal to generate the reproduction information of the input video signal, the apparatus comprising: a scene-change-detecting unit that detects a scene change in the input video signal; and a display-position-controlling unit that determines a display position of an image of the input video signal after the scene change in relation to a display position of an image of the input video signal before the scene change based on a detection result in the scene-change-detecting unit, wherein the display-position-controlling unit detects an eye direction of a face region in the images of the input video signal before and after the scene change and generates the reproduction information to determine a display position of the image of the input video signal after the scene change based on the eye direction of the face region in the images of the input video signal before and after the scene change, and wherein the display-position-controlling unit includes: a first face-region-extracting section that extracts the face region from the input video signal; a first eye-direction-detecting section that detects a first eye direction from the region of face image extracted in the first face-region-extracting section; a delay section that delays the input video signal to generate a delayed input video signal; a second face-region-extracting section that extracts a region of face image from the delayed input video signal received from the delay section; a second eye-direction-detecting section that detects a second direction of an eye direction from the region of face image extracted in the second face-region-extracting section; and a display-direction-deciding section that decides the display direction of the image of the input video signal after the scene change relative to the display position of the image of the input video signal before the scene change based on the first and second eye directions.

10. The apparatus according to claim 9, wherein the display-position-controlling unit detects the eye direction of each face region in the images of the input video signal before and after the scene change and determines the display position of the image of the input video signal after the scene change based on the detected eye direction of each face region in the images of the input video signal before and after the scene change, and the apparatus further comprising a display unit that displays the input video signal according to the determined display position.

11. A method of generating reproduction information on an input video signal image by processing the input video signal, the method comprising: detecting a scene change in the input video signal; and determining a display position of an image of the input video signal after the scene change in relation to a display position of an image of the input video signal before the scene change based on a detection result of the detecting, wherein the determining includes detecting an eye direction of a face region in the images of the input video signal before and after the scene change and generating the reproduction information to determine a display position of the image of the input video signal after the scene change based on the eye direction of the face region in the images of the input video signal before and after the scene change, and the determining further includes: extracting the face region from the input video signal; detecting a first eye direction from the region of face image extracted in the extracting; delaying the input video signal to generate a delayed input video signal; extracting a second region of face image from the delayed input video signal; detecting a second direction of an eye direction from the second region of face image; and deciding the display direction of the image of the video signal after the scene change relative to the display position of the image of the input video signal before the scene change based on the first and second eye directions.

12. The method according to claim 11, wherein the determining includes detecting the eye direction of each face region in the images of the input video signal before and after the scene change and determining the display position of the image of the input video signal after the scene change based on the detected eye direction of each face region in the images of the input video signal before and after the scene change, and the method further comprising displaying the input video signal according to the determined display position.

13. A non-transitory computer readable storage medium storing instructions thereon, which, when executed by a computer, cause the computer to generate reproduction information for reproducing an input video signal by implementing a method comprising: detecting a scene change in the input video signal and determining a display position of an image of the input video signal after the scene change in relation to a display position of an image of the input video signal before the scene change based on a detection result of the detecting, wherein the determining includes detecting an eye direction of a face region in the images of the input video signal before and after the scene change and generating the reproduction information to determine a display position of the image of the input video signal after the scene change based on the eye direction of the face region in the images of the input video signal before and after the scene change, and the determining further includes: extracting the face region from the input video signal; detecting a first eye direction from the region of face image extracted in the extracting; delaying the input video signal to generate a delayed input video signal; extracting a second region of face image from the delayed input video signal; detecting a second direction of an eye direction from the second region of face image; deciding the display direction of the image of the input video signal after the scene change relative to the display position of the image of the input video signal before the scene change based on the first and second eye directions.

14. The non-transitory computer readable storage medium according to claim 13, wherein the determining includes detecting the eye direction of each face region in the images of the input video signal before and after the scene change and determining the display position of the image of the input video signal after the scene change based on the detected eye direction of each face region in the images of the input video signal before and after the scene change, and the method further comprising displaying the input video signal according to the determined display position.

* * * * *